United States Patent [19]
Keolian et al.

[11] Patent Number: 5,313,266
[45] Date of Patent: May 17, 1994

[54] DEMODULATORS FOR OPTICAL FIBER INTERFEROMETERS WITH [3×3] OUTPUTS

[76] Inventors: Robert M. Keolian, 1176 Josselyn Canyon Rd., Monterey, Calif. 93940; Steven L. Garrett, 25101 Aguajito Rd., Carmel, Calif. 93923; Charles B. Cameron, 1528 Westerfield Rd., Virginia Beach, Va. 23455-4359

[21] Appl. No.: 931,228

[22] Filed: Aug. 17, 1992

[51] Int. Cl.$^5$ ............................................. G01B 9/02
[52] U.S. Cl. ............................ 356/345; 250/227.19; 250/227.27
[58] Field of Search .............................. 356/345, 350; 250/227.19, 227.27; 385/12, 14

[56] References Cited

U.S. PATENT DOCUMENTS

| | | | |
|---|---|---|---|
| 4,557,414 | 3/1986 | Migliori et al. | 33/363 |
| 4,893,930 | 1/1990 | Garrett et al. | 356/345 |
| 4,951,271 | 2/1990 | Garrett et al. | 367/141 |
| 4,959,539 | 9/1990 | Hofler et al. | 250/227 |
| 5,042,157 | 8/1991 | Garrett et al. | 33/363 |

OTHER PUBLICATIONS

Cameron, Charles B. "Recovering Signals from Optical Fiber Interferometric Sensors" Naval Postgraduate School, Monterey, Calif. Published Aug. 19, 1991.
Crooker, Carol Mae "Two Demodulators for High Sensitivity Fiber Optic Interferometric Sensors" Naval Postgraduate School, Moterey, Calif. 1987.
Brown et al. "A Symmetric 3×3 Coupler Based Demodulator for Fiber Optic Interferometric Sensors" Proceedings of the SPIE: Fiber Optic and Laser Sensors, V. 1584, pp. 328-336 Dec. 31, 1991 USA.
Crooker et al. "Fringe Rate Demodulator for Fiber Optic Interferometric Sensors" Proceedings of the SPIE: Fiber Optic and Laser Sensors, 838, pp. 329-331 (1987) USA.
Koo et al. "Passive Stabilization Scheme for Fiber Interferometers Using (3×3) Fiber Directional Couplers" Appl. Phys. Lett.41 (7) (1982) USA.
Dandridge "Fiber Optic Sensors Based on the Mach-Zehnder and Michelson Interferometers" in *Fiber Optic Sensors* E. Udd (Editor), John Wiley & Sons, New York (1991) USA.
Hofler et al. "Thermal Noise in a Fiber Optic Sensor", J. Acoust. Soc. Am. 84 (2) pp. 471-475 (1988) USA.
Gardner et al. "A Fiber-Optic Interferometric Sensometer", J. Lightwave Tech, LT-5 (7) pp. 953-960 (1987) USA.
Danielson et al. "Fiber-Optic Ellipsoidal Flextensional Hydrophones" J. Lightwave Tech vol. 7 (12), pp. 1995-2002 (1989) USA.
Garrett et al. "A General Purpose Fiber-Optic Hydrophone Made of Castable Epoxy" Proceedings of the SPIE: Fiber Optic and Laser Sensors pp. 13-29 (1990) USA.

*Primary Examiner*—Samuel A. Turner
*Attorney, Agent, or Firm*—Kenneth L. Warsh

[57] ABSTRACT

A highly sensitive optical fiber interferometer sensor comprising a laser light source, a [2×2] optical fiber coupler to split the beam in two, a differential transducer which converts a signal of interest into optical phase shift in the laser light transmitted through the two optical fibers in the interferometer and a [3×3] optical fiber complex which recombines the two beams, producing interference which can be electronically detected. The use of the [3×3] coupler permits Passive Homodyne demodulation of the phase-modulated signals provided by the interferometer without feedback control or modulation of the laser itself and without requiring the use of electronics within the interferometer.

7 Claims, 9 Drawing Sheets

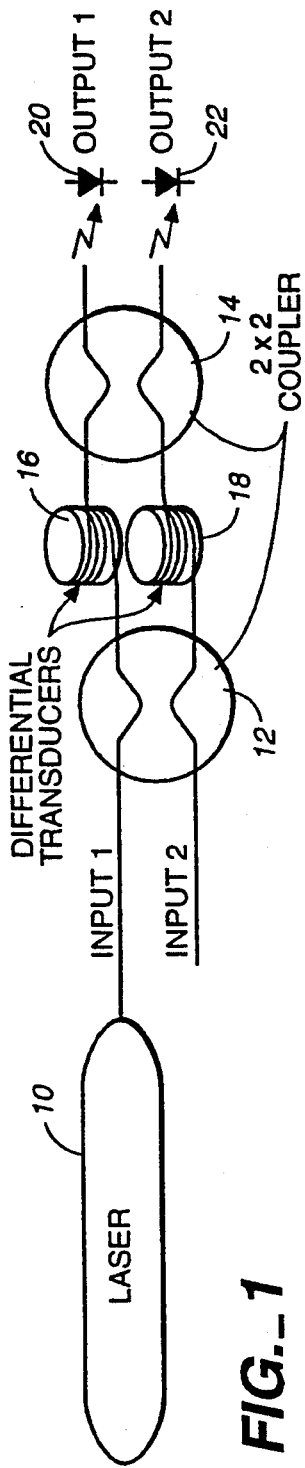
FIG._1
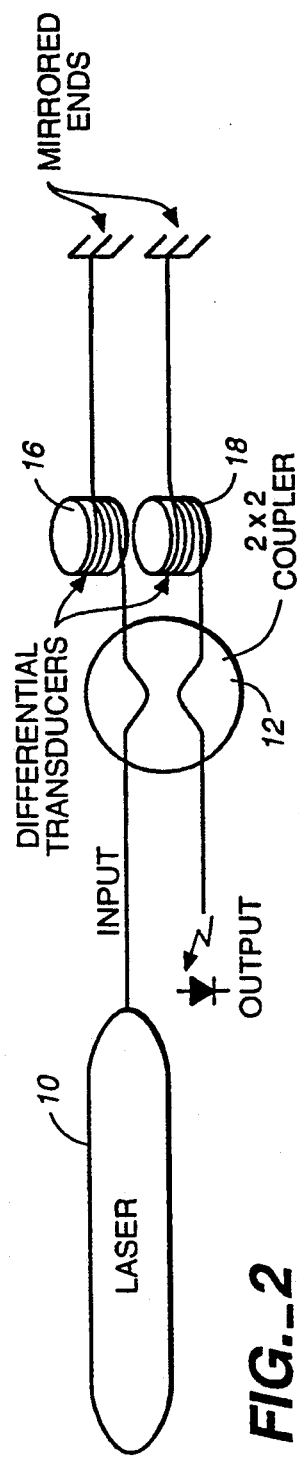
FIG._2
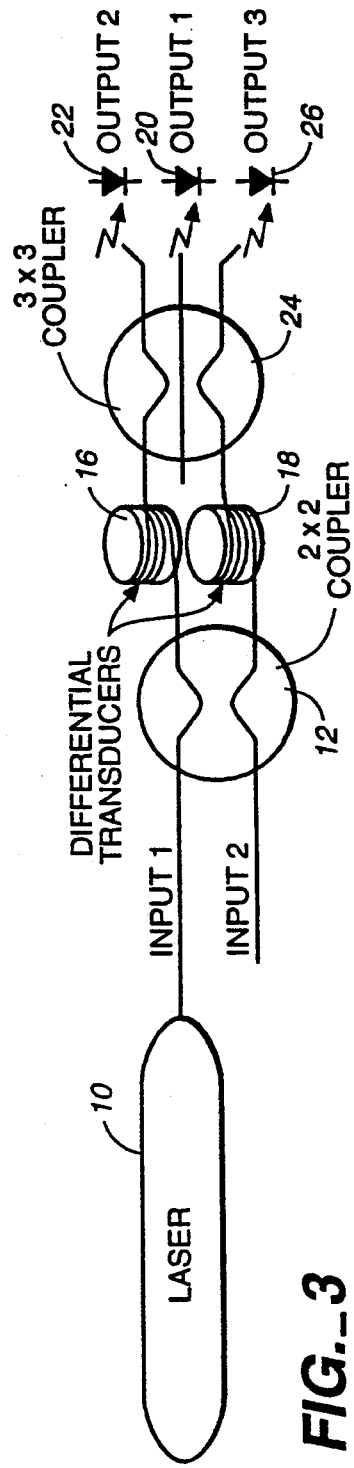
FIG._3

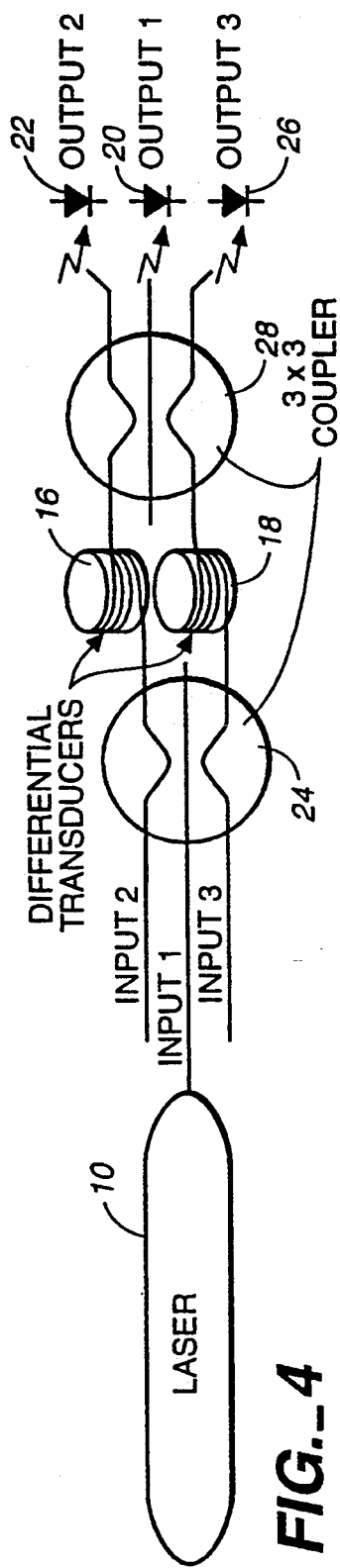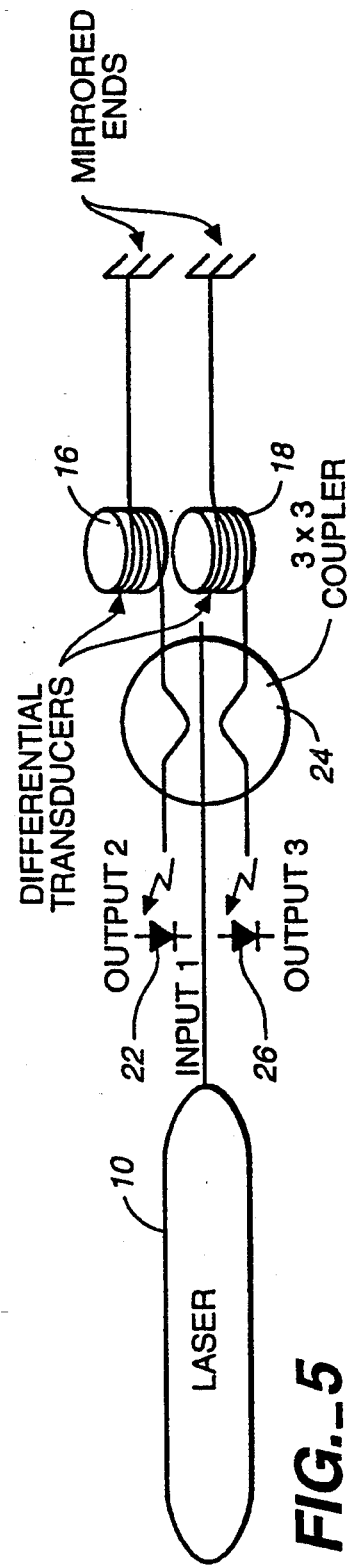

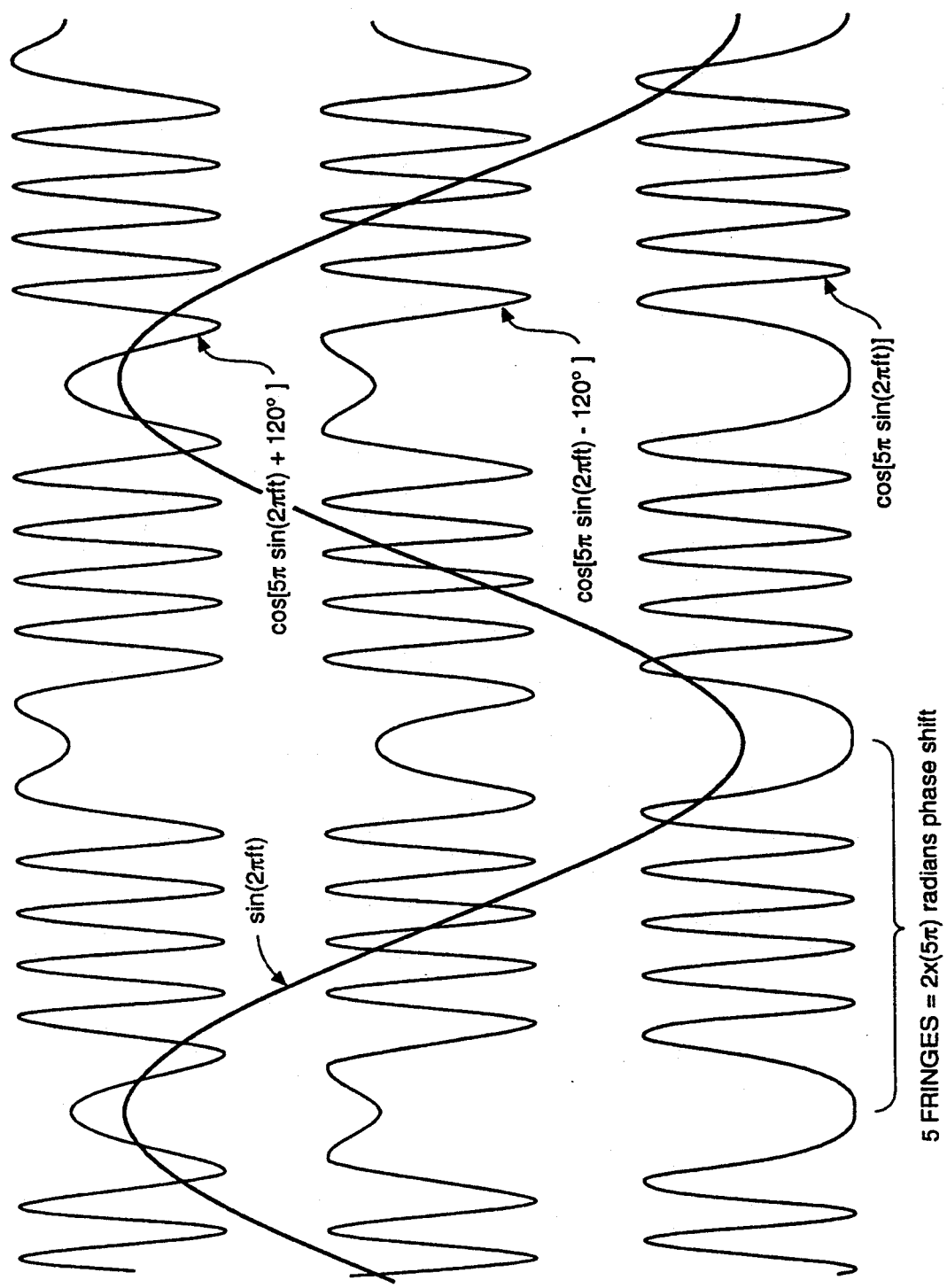
FIG._6

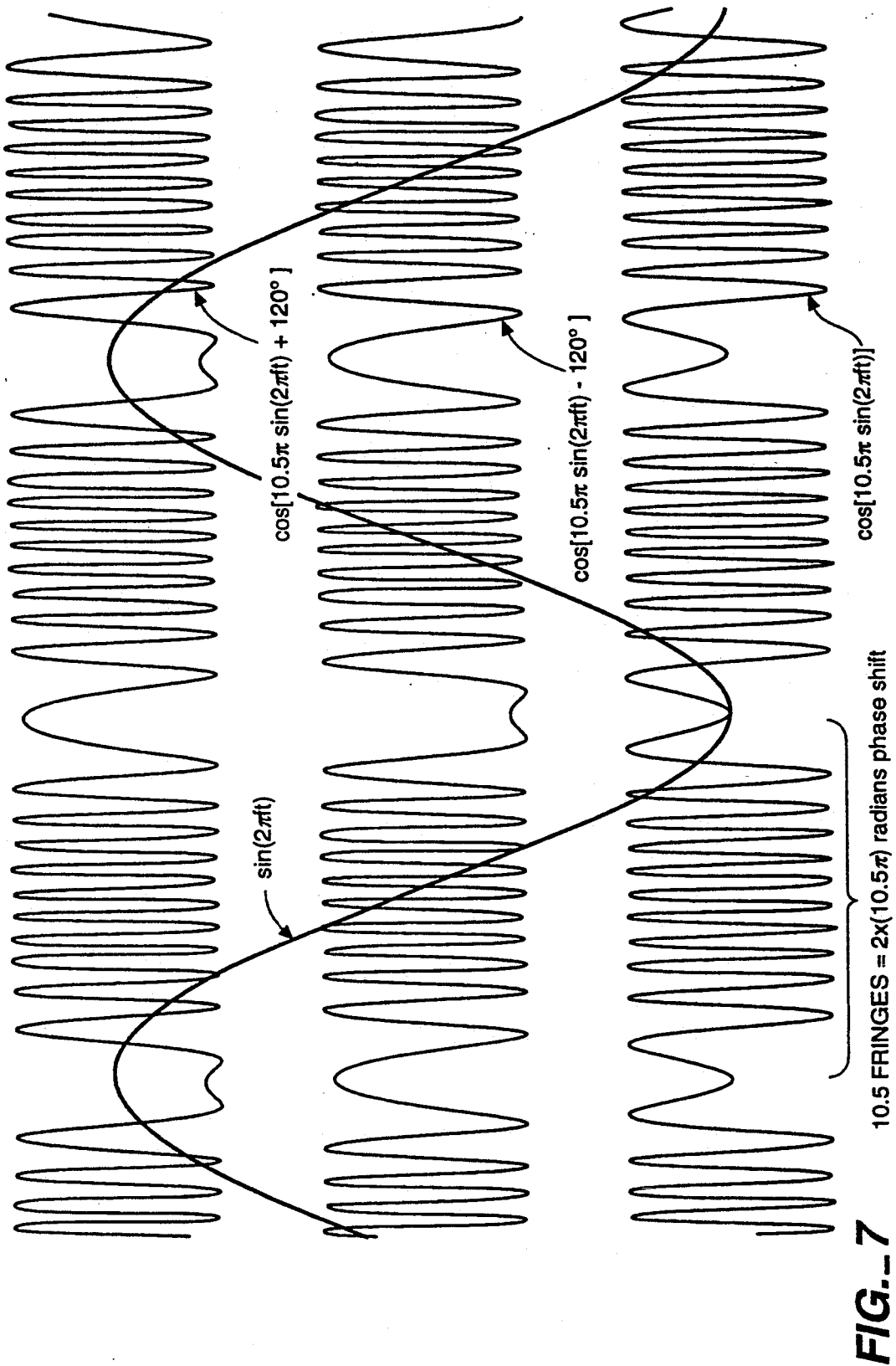
FIG._7

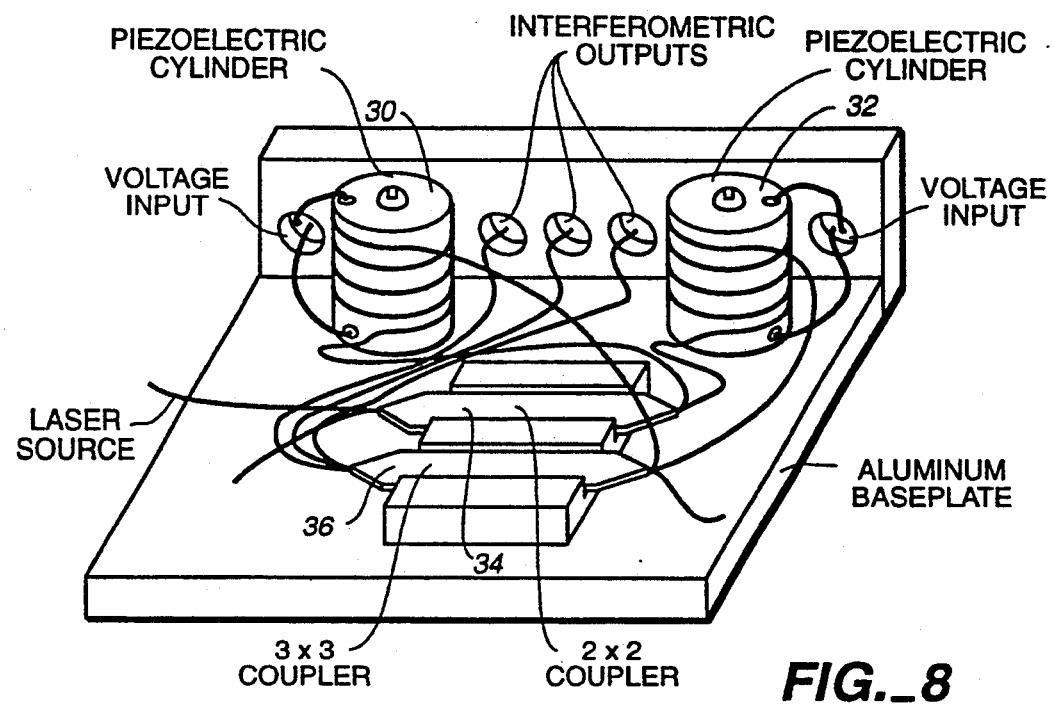
FIG._8
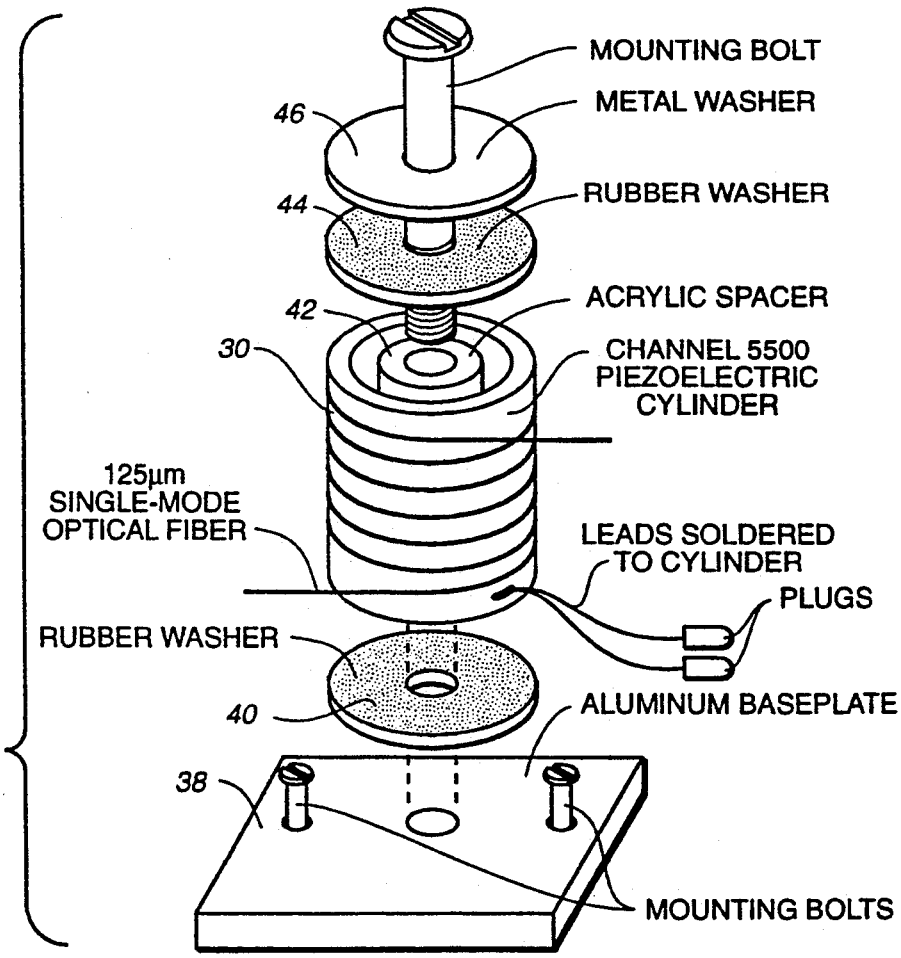
FIG._9

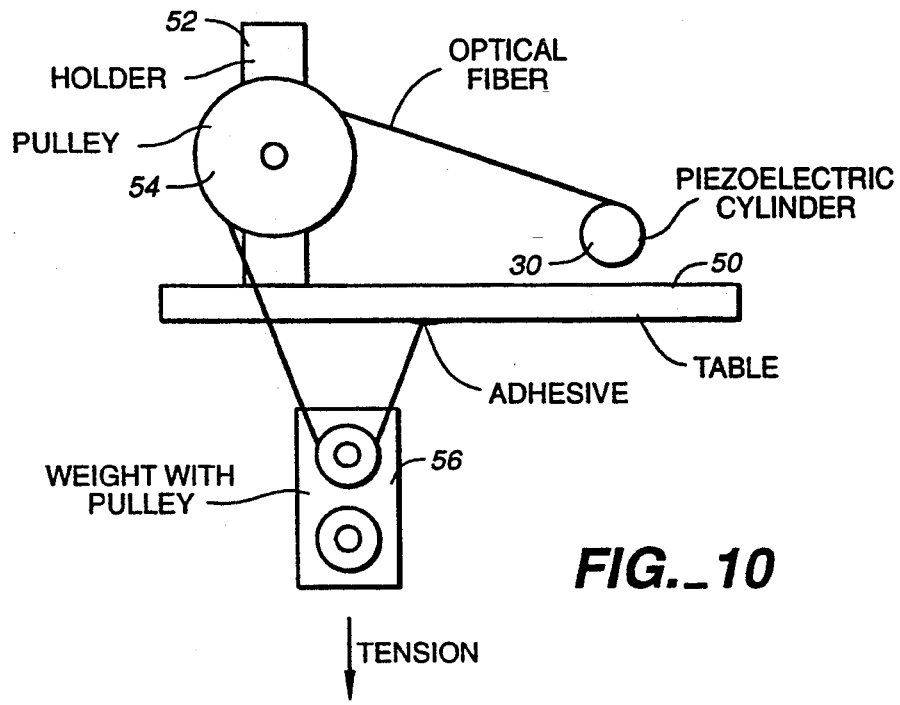
FIG._10
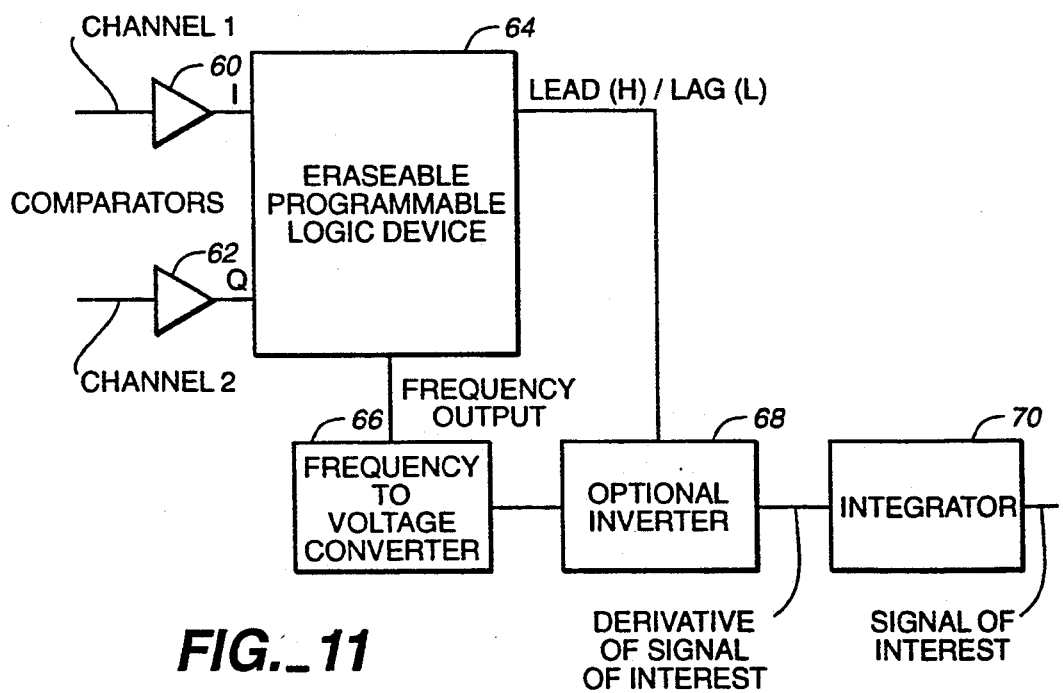
FIG._11

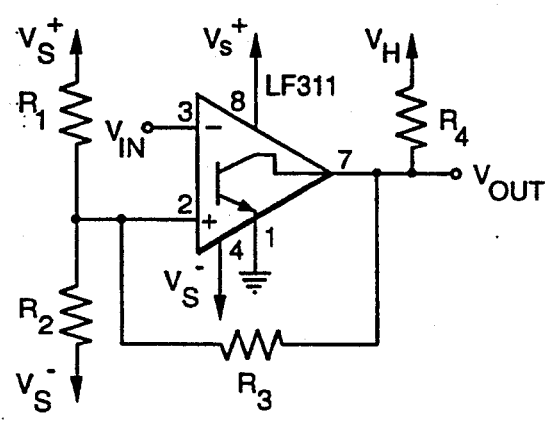
FIG._12A  FIG._12B
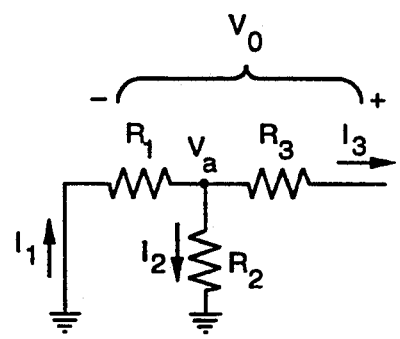
FIG._13  FIG._14
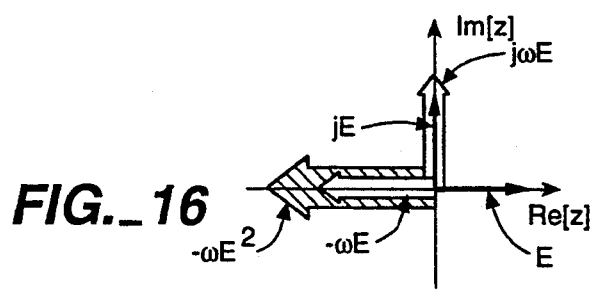
FIG._16
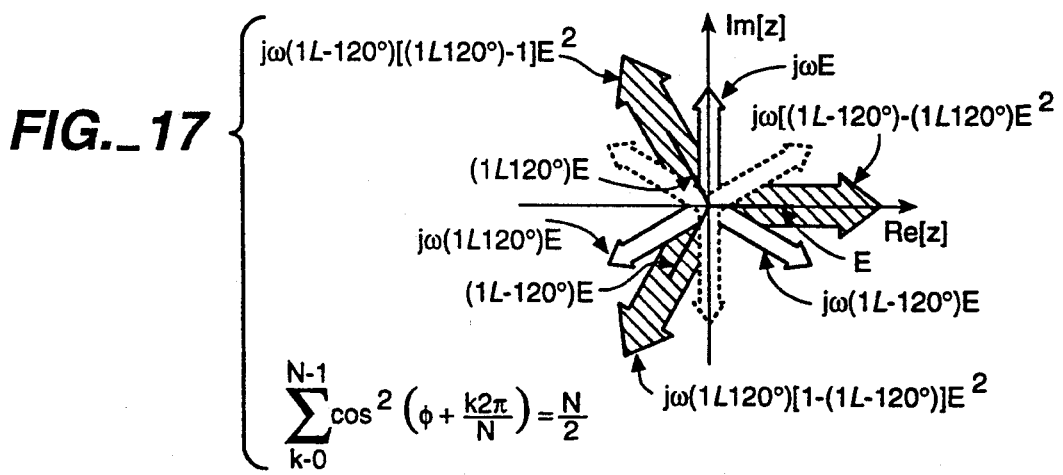
FIG._17

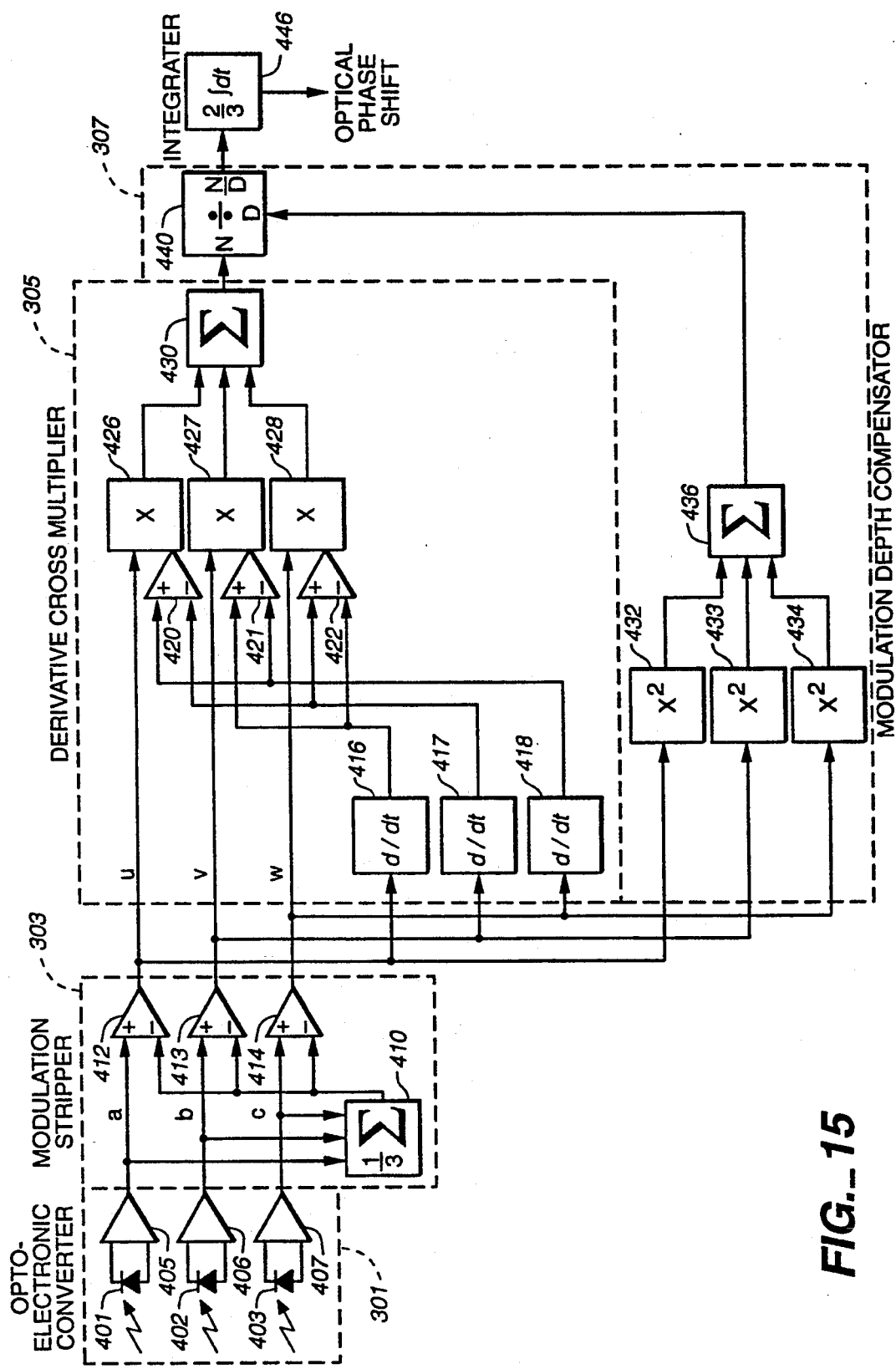
FIG._15

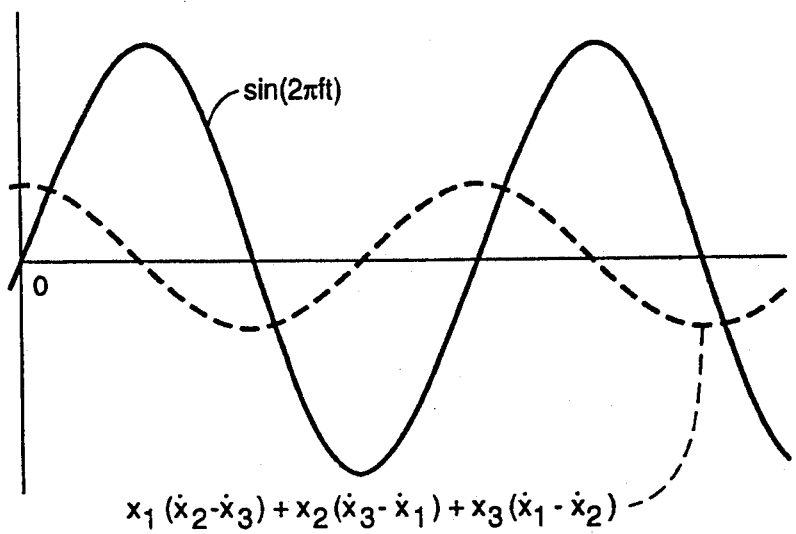
FIG._18
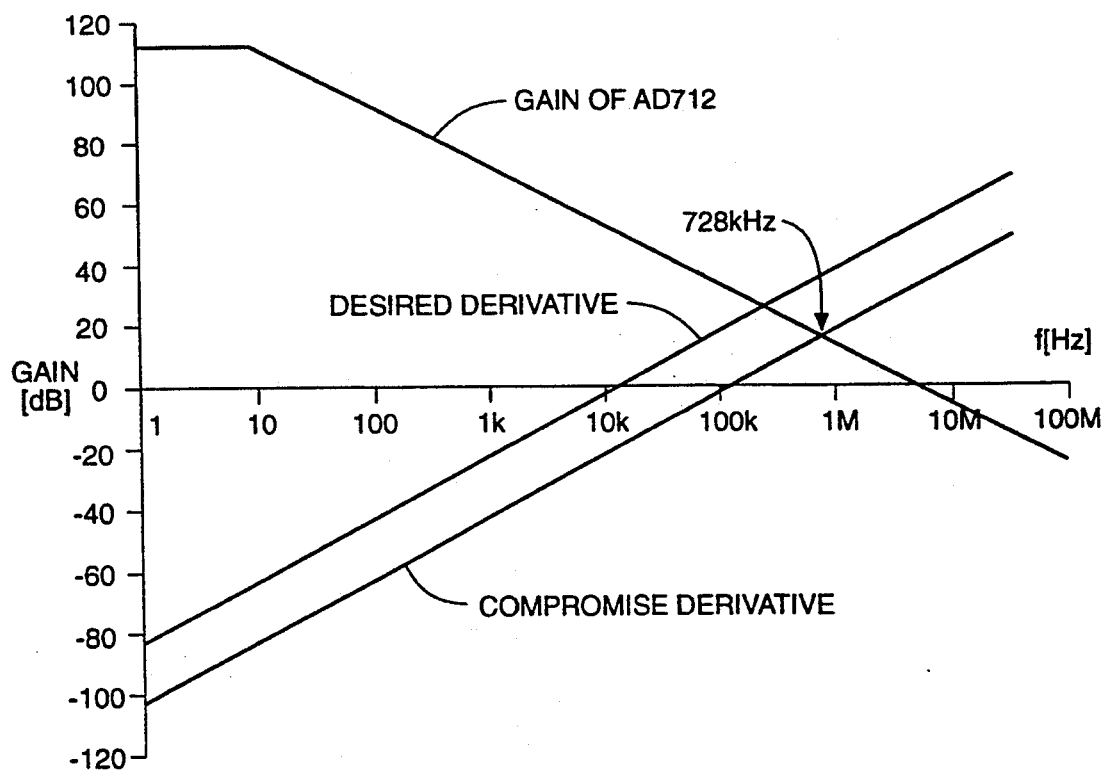
FIG._19

DEMODULATORS FOR OPTICAL FIBER INTERFEROMETERS WITH [3×3] OUTPUTS

FIELD OF THE INVENTION

This invention pertains to a method and apparatus for assembling a sensitive optical interferometer sensor.

BACKGROUND OF THE INVENTION

Since the first application of an optical fiber interferometer as a means of detecting an acoustical signal, there have been a long series of improvements to the sensitivity, selectivity, and robustness of this fiber-optic sensor strategy. (Bucaro el al, "Fiber optic hydrophone", J. Acoust. Soc. Am 62, 1302 (1977)). This development has resulted in the fabrication of fiber-optic acoustic and vibration sensors which are capable of reaching the phenomenological limitations of this technology imposed by the elastic properties of optical fibers and the unavoidable noise introduced by thermal fluctuations. (Gardner et al, "Fiber optic seismic sensor", *Fiber Optic and Laser Sensors V*, Proc. Soc. Photo Optical Inst. Eng. (SPIE) 838, 271–278 (1987); Garrett et al, "Multiple axis fiber optic interferometric seismic sensor", U.S. Pat. No. 4,893,930 (Jan. 16, 1990); Danielson et al, "Fiber optic ellipsoidal flextensional hydrophones", J. Lightwave Tech. LT-7(12), 195–2002 (1989); Garrett et al, "Flextensional hydrophones", U.S. Pat. No. 4,951,271 (Aug. 21, 1990); Garrett et al, "A general purpose fiber-optic interferometric hydrophone made of castable epoxy", *Fiber Optic and laser Sensors V.III*, Proc. Soc. Photo Optical Inst. Eng. (SPIE) 1367, 13–29 (1990); U.S. Pat. No. 4,959,539 (Sept. 25, 1990); Hofler et al, "Thermal noise in a fiber-optic sensor", J. Acoust. Soc. Am. 84(2), 471(1988); J. Acoust. Soc. Am. 87(3), 1363 (1990).) In order to produce a complete fiber-optic interferometric sensing system, one must also provide a light source and an opto-electronic receiver/demodulator, in addition to the sensor.

The receiver/demodulator converts the time varying optical power into a representation (analog or digital) of the original stimulus. The optical power modulations contain the information about the measurand that has been encoded as an optical phase modulation by the interferometric sensor. Ideally, this conversion creates a signal which is linearly proportional to the measurand. This conversion of the optically encoded signal back into a linear representation of the stimulus is by no means trivial. The optical signal may contain frequency components which are hundreds of times higher than those in the measurand signal for large signals which create many interference fringes for each cycle. For small signals which do not create a complete fringe, it may not even contain the fundamental signal frequency of the signal of interest. Furthermore, the demodulator should be able to compensate for fluctuations in the amplitude of the light source and drifts in the polarization of the light within the interferometer and other changes which might effect the interferometric fringe visibility (also known as the modulation depth) and the total optical power received by the demodulator.

The particular choices for these three components of the interferometric sensor system (i.e., the sensor, light source, and demodulator) are not independent. For example, a pseudo-heterodyne demodulation system using a phase generated carrier, requires that the sensing interferometer have an optical path imbalance and that the semiconductor laser diode light source wavelength be modulated, usually as a result of modulation of the current through the laser diode. These interlocked choices also effect the overall system performance. (Dandridge et al, "Homodyne demodulation scheme for fiber optic sensors using phase generated carrier", IEEE J. Quantum Electron. QE-18, 1647 (1982)) For example, a small path length imbalance will require large amplitude current modulation of the diode laser which leads to mode hopping and excess noise. Alternatively, if the path length imbalance is increased in order to reduce the laser diode current modulation requirement, then a laser with a longer coherence length must be used to insure that interference will still take place. Long coherence length laser diodes are expensive. In addition, the interferometer noise is also linearly proportional to the path length mismatch for a given amount of laser phase noise, so increases in the path length mismatch also introduce excess noise. (Dandridge et al, "Phase noise of single-mode diode lasers in interferometric systems", Appl. Phys. Lett. 17, 937 (1981))

The problems associated with the pseudo-heterodyne demodulation and other schemes which require a "carrier" signal are not limited to the conflicting requirements for the light source, sensor, and demodulator. There are other technological difficulties which also degrade both the utility and the performance of these demodulators. These include system set-up complexity, dynamic range limitations, and scale factor instability. Although a detailed discussion of these problems would be beyond the scope of this disclosure, it is at least worth identifying their common phenomenological root.

The interferometric output, represented by the current, i, generated by the photodetector that receives the optical output of the coupler, can be expressed as the sum of an infinite series of Bessel Functions as shown below, $$i \approx \cos\phi_d \left[ J_0(\phi_s) + 2 \sum_{n=1}^{\infty} J_{2n}(\phi_s)\cos 2n\omega t \right] + \sin\phi_d \left[ 2 \sum_{n=0}^{\infty} J_{2n+1}(\phi_s)\sin((2n+1)\omega t) \right] \quad (1)$$

where $\phi_d$ is the quasi-static phase difference between the electric field vectors in the two legs of the interferometer and $\phi_s$ is the magnitude of the phase modulation, at angular frequency, $\omega$, which was induced in the sensor by the measurand. Heterodyne demodulation techniques introduce a "carrier signal" which consists of a phase modulation of amplitude $\phi_m$, and of frequency $\omega_m$, which must be at least a factor-of-two higher than the highest frequency of interest generated by the measurand. The amplitude of the carrier phase modulation (or operationally, the amplitude of the laser diode current modulation) is usually chosen so that two adjacent Bessel function components in the series, for example $J_1$ and $J_2$, or $J_2$ and $J_3$, have equal amplitude. The signal of interest then appears as side-bands on the carrier frequency and its harmonics.

These side-bands can then be "stripped" off of the carrier to provide an in-phase and quadrature signal which can be used to reconstruct the measurand by a conventional sine-cosine demodulation process which involves differentiation, cross-multiplication, summing, and integration. The sine-cosine reconstruction algorithm is based on the Pythagorean trigonometric identity, $\sin^2\theta + \cos^2\theta = 1$. The differentiation of each of the signals produces an output which is proportional to the time derivative $d\theta/dt$. The cross-multiplication and summation produces the constant times the derivative, $(d\theta/dt)(\sin^2\theta + \cos^2\theta)$. Integration of $d\theta/dt$ with respect to time then recovers the phase modulation signal of interest, $\theta$.

Although the heterodyne demodulation process described above seems relatively straight-forward to one skilled in the art, there are many practical difficulties in its implementation, some of which are rather subtle. Since the previous process uses only two harmonics of the infinite series of harmonics, the total optical power is not available unless some other means is employed to obtain that parameter. This means that the process cannot compensate for fluctuations in the laser power or the interferometric fringe visibility. This leads to variations in the scale factor which characterizes the circuit's conversion of optical phase in radians to electrical output in volts. There is no way, in principle, to differentiate between a change in demodulator scale factor and a change in the amplitude of the measurement if a calibration signal is not inserted into the system.

Also, in the previous discussion no mention was made of how the chosen pair of Bessel function amplitudes were set equal and how their equality was to be maintained. In the present implementation of the pseudo-heterodyne demodulators (also called "passive homodyne" demodulators), the adjustment of the Bessel function amplitudes and the determination of their orthogonality (i.e. establishment of the "pure" in-phase and quadrature relationship) is done by a skilled technician. This adjustment typically requires the use of a Fast Fourier Transform (FFT) signal analyzer to adjust the Bessel amplitudes and an oscilloscope in the Lissajous mode to determine the orthogonality. Periodic readjustments must be made to compensate for drifts in the light source and the interferometer. The scale factor will again be a function of both the Bessel function equality and orthogonality. Though it should be possible in the future to make these adjustments, now done by a skilled technician, using some automatic feed-back control system, this would again add to the complexity and cost of the required circuitry. If it were simple, it would already have been done!

Finally, the use of the phase modulation of the carrier places a limit on the dynamic range of the heterodyne demodulator. As stated before, large signals create frequency components which can be higher harmonics of the signal of interest. Since the frequency spacing of the carrier frequency harmonics is $\omega_m$ the demodulation algorithm fails when the signal of interest contains frequency components which are greater than or equal to $\omega_m/2$ because the lower side-bands of the upper carrier would become indistinguishable from the upper side-bands of the lower carrier. One cannot arbitrarily increase $\omega_m$ in order to increase the dynamic range since thermal time constants of the laser diodes restrict current induced wavelength modulation frequencies to about 100 Khz. Due to this dynamic range limitation, most of the heterodyne fiber optic sensor demodulators have been restricted to low phase rates and hence have had to produce acceptable dynamic ranges ($\approx 120$ dB) by being able to detect very low amplitude phase modulations ($\approx 1-10 \ \mu\text{rad}/\sqrt{\text{Hz}}$).

From the previous discussion of the sine-cosine demodulation process, it should be apparent that two signals (i.e. in-phase and quadrature) which contain the phase information are required to reconstruct the measurand. In the heterodyne demodulator, this was accomplished by using the side-bands of two carrier harmonics. Another approach which has been used to produce the in-phase and quadrature signals is an interferometer that employs a [3×3] coupler as the output coupler. (A. Dandridge, "Fiber optic sensors based on the Mach-Zender and Michelson interferometers", in *Fiber Optic Sensors: An Introduction for Engineers and Scientists*, Eric Udd, editor (Wiley-Interscience, 1991), Chap. 10) Due to energy conservation, the outputs of a [2×2] coupler are 180° out-of-phase. When one of the [2×2] outputs is at its maximum, the other must be a minimum, since the total optical power out of the coupler, which is a passive device, must be constant for a constant input power. In an ideal, symmetric (i.e. equal split ratio) [3×3] coupler, the outputs have a relative phase difference of 120°.

In the previous attempts to produce a demodulator using the outputs of a [3×3] coupler, two of these three outputs were combined in order to produce the in-phase and quadrature signals which would then be processed by the sine-cosine demodulation algorithm described in the previous sub-section. (K. P. Koo, A. B. Tveten, and A. Dandridge, "Passive Stabilization Scheme for Fiber Interferometry Using (3×3) Fiber Directional Couplers, Appl. Phys. Lett. 41, 616 (1982)) If we represent two of the three outputs from the [3×3] coupler, $I_2$, and $I_3$, as shown below, $$I_2 = B_1 + B_2 \cos \Delta\phi + B_3 \sin \Delta\phi \qquad (2)$$

$$I_3 = B_1 + B_2 \cos \Delta\phi - B_3 \sin \Delta\phi \qquad (3)$$

then by forming their sum and difference, $$I_2 + I_3 = 2B_1 + 2B_2 \cos \Delta\phi \text{ and } I_2 - I_3 = 2B_3 \sin \Delta\phi \qquad (4)$$

the in-phase ($\cos \Delta\phi$) and quadrature ($\sin \Delta\phi$) signals can be obtained after gain adjustment and offset subtraction.

Although the use of the [3×3] coupler to produce the in-phase and quadrature signal eliminates the problems of the heterodyne approach such as light source wavelength modulation, the required optical path imbalance, Bessel function balance and orthogonality, and the intrinsic dynamic range limitations, the [3×3] homodyne demodulation using only two of the three outputs to produce inputs for the sine-cosine algorithm has its own limitations. Again, the total power is not available, since only two of the outputs were utilized, hence no compensation is included for light source power variations or changes in fringe visibility. The lack of symmetry in the demodulation process also reduces the robustness of the algorithm against fluctuations in the split ratio, which is assumed to be equal for each of the three outputs.

It is within this context, and in response to the recent availability of [3×3] with good environmental stability and polarization insensitivity, that the new "Symmetric Demodulator for Optical Fiber Interferometers with [3×3] Outputs" was developed. (Davis et al, "Characterization of 3×3 Fiber Couplers for Passive Homodyne Systems: Polarization and Temperature Sensitivity", paper WQ2, *Proc. Optical Fiber Communications Conference*, Houston, Tex., Feb. 6–9, 1989)

OBJECTIVES OF THE INVENTION

The primary objective of this invention is the creation of an opto-electronic circuit that will convert the time varying output intensities from an interferometer having a three-by-three [3×3] evanescent wave fiber-optic coupler into an electrical signal. The electrical signal produced by the demodulator should be an analog or digital reconstruction of the time-varying amplitude modulation of the optical path difference in an interferometer which is terminated by such a coupler. The path modulation would typically be produced in an interferometric fiber-optic sensor where a measurand or signal of interest, such as acceleration or acoustical pressure variation, would produce a signal encoded as an optical phase modulation within the two legs of an optical fiber interferometer. The technique should be capable of demodulation both small (less than one fringe) and large (multi-fringe) optically phase-encoded signals and automatically compensate for intensity variations due to such factors as changes in the optical power of the light source and changes in interferometric fringe visibility (modulation depth).

SUMMARY OF THE INVENTION

These objects of the invention and other objects, features and advantages to become apparent as the specification progresses are accomplished by the invention according to which, briefly stated, a highly sensitive optical fiber interferometer sensor comprising a laser light source, a [2×2] optical fiber coupler to split the beam in two, a differential transducer which converts a signal of interest into optical phase shift in the laser light transmitted through the two optical fibers in the interferometer and a [3×3] optical complex which recombines the two beams, producing interference which can be electronically detected. The use of the [3×3] coupler permits Passive Homodyne demodulation of the phase-modulated signals provided by the interferometer without feedback control or modulation of the laser itself and without requiring the use of electronics within the interferometer.

LIST OF ADVANTAGES OF THE INVENTION

In considering the advantages of the symmetric demodulator, it is important to remember that the choice of the demodulator also impacts on the sensor and the light source.

The advantages of this demodulator over the heterodyne demodulators are summarized below:

a. This technique works from the sub-fringe through the multiple-fringe range of optically encoded interferometric signals.

b. No modulation of light source wavelength is required. This reduces noise, since there is less probability that the laser will "mode hop", and cost, since the additional laser current modulation circuitry is not required.

c. No optical path-length mismatch is required. This means that laser phase noise does not appear as interferometer output power noise which is linearly proportional to the interferometer optical path length mismatch. This also means that the coherence length of the laser used as the light source can be significantly shorter and hence cheaper laser diodes can be used.

d. Since the signals required for demodulation are not extracted as side-bands on a carrier, no Bessel amplitude equalization or orthogonalization is required. Hence, a skilled technician with expensive test equipment (FFT analyzer and oscilloscope) is not required for demodulator set-up and adjustment.

e. Since no carrier is required, there is no intrinsic limitation on the magnitude of the phase modulation produced by the sensor which the demodulator can successfully process. This has the advantage of allowing exploitation of the newly developed class of push-pull fiber optic interferometric sensors that produce signals which are 20 to 50 dB greater than the older sensor-reference coil interferometric topologies which relied on special coatings on the fibers to enhance sensitivity to the measurand of interest while suppressing response of the sensing leg.

f. Since all of the power from the interferometer is used by the symmetric demodulator, the symmetric demodulator is capable of maintaining a stable scale factor (volts/radian) even in the presence of variations in the total power and in the fringe visibility.

The advantages of the symmetric demodulator over the homodyne demodulator which uses only two of the three outputs of the [3×3] coupler to provide the inputs to the sine-cosine demodulator include stability of scale factor for variations in the average power and fringe visibility, and robustness against imperfections in the fabrication of the [3×3] coupler which lead to small deviations in the power split ratio and deviations from an exact ±120° phase relation between the three outputs.

General advantages of this new symmetric demodulation technique also arise out of the fact that this demodulator does not require elaborate diode laser modulation and stabilization circuitry and does not require expensive (long coherence-length laser diodes. Due to the fact that simple power circuits and cheap lasers are employed, new multiplexing topologies are now economical and potentially more robust. For example, each sensor can now be provided with its own laser that can be "chopped" at a specific (probably RF) frequency. The three outputs from each sensor can be place on a single "bus" which requires only three fibers, either multimode or single mode, that can carry a great number of sensor signals back to the three receivers. The signals from the individual sensors can be separated after the receiver using conventional techniques used extensively in radio receivers and sent to individual symmetric demodulation circuits. In heterodyne based multiplexed systems, use of separate lasers is typically not economical since those lasers are expensive and require elaborate control circuitry.

In some applications the user requires output in a digital format. This symmetric demodulator may be implemented digitally as well as in analog electronic circuitry. This would be accomplished by performing the analog-to-digital (A-to-D) conversion at the output of each of the three receivers and then performing the mathematical operations digitally. Because the signal is phase-modulated, the demodulator is capable of producing an output which has a dynamic range which is much greater than that of the input analog-to-digital converter. Large amplitude signals result in higher frequencies, not greater optical power modulation. Accordingly, a faster A-to-D is required to increase dynamic range, not necessarily an A-to-D with more bits of resolution.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 is a schematic drawing of a Mach-Zender optical fiber interferometric sensor with [2×2] optical fiber couplers at both the input and the output.

FIG. 2 is a schematic drawing of a Michelson optical fiber interferometric sensor with a single [2×2] optical fiber coupler serving as both the input and the output.

FIG. 3 shows a Mach-Zender optical fiber interferometric sensor with a [2×2] optical fiber coupler at the input and a [3×3] optical fiber coupler at the output.

FIG. 4 shows a Mach-Zender optical fiber interferometric sensor with a [3×3] optical fiber coupler at the input and a [3×3] optical fiber coupler at the output.

FIG. 5 shows a Michelson interferometer with a [3×3] coupler serving both as input and output with only two outputs available, since one of the three strands of glass in the coupler is devoted to the input.

FIG. 6 shows graphs of the outputs described in Eqn. 5 for amplitude of the stimulus, $A = 5\pi$ radians.

FIG. 7 shows graphs of the outputs differing from FIG. 6 only in different choice of the amplitude of the stimulus, $A = 10.5\pi$ radians.

FIG. 8 shows the physical layout of an optical fiber interferometric sensor of voltages.

FIG. 9 shows a detail of the assembly of the piezoelectric cylinders with fiber wrapped around them.

FIG. 10 shows the apparatus used to obtain constant tension in the fiber wrapped by hand on the cylinders.

FIG. 11 is a block diagram of the fringe rate demodulator.

FIGS. 12A and 12B are Karnaugh maps of logic needed to generate LL.

FIG. 13 is a comparator circuit used to convert bipolar interferometric outputs to binary levels.

FIG. 14 shows a Tee-network used to obtain large resistance.

FIG. 15 is a block diagram of the symmetric demodulation algorithm.

FIG. 16 is a phasor diagram depicting the operation of the asymmetric demodulation technique.

FIG. 17 is a phasor diagram depicting the operation of the symmetric demodulation technique.

FIG. 18 is a diagram showing the adding of the three products of signals with differences of derivatives, showing the original stimulus of $A = 5\pi$ radians superimposed.

FIG. 19 is a Bode plot of the gain and the desired differentiator gain characteristic.

GLOSSARY

The following is a glossary of elements and structural members as referenced and employed in the present invention.

10-laser used as an optical beam source for coherent light
12, 14-[2×2] optical coupler
16, 18-transducers used to introduce a signal of interest into the optical beam
20, 22, 26-optical signal detectors, for example photo diodes
24, 28-optical couplers
30, 32-piezoelectric cylinders
34-[2×2] coupler
36-[3×3] coupler
38-baseplate
40-rubber washer
42-acrylic spacer
44-rubber washer
46-metal washer
50-table
52-spindle
54-pulley
56-weighted pulley
60, 62-comparators
64-erasable programmable logic device (EPLD)
66-frequency to voltage convertor
68-optional invertor
70-integrator
301-optoelectronic converter
303-modulation stripper
305-derivative cross multiplier
307-modulation depth compensator
401,402,403-photodiodes
405,406,407-photodiode amplifiers
410-summing and scaling circuit
412,413,414-difference amplifiers
416,417,418-differentiating circuits
420,421,422-difference amplifiers
426,427,428-multiplying circuits
430-summing circuit
432,433,434-squaring circuits
436-summing circuit
440-division circuit
446-integrating circuit

DESCRIPTION OF THE PREFERRED EMBODIMENT

First we describe a mathematical prediction of the performance of an optical fiber interferometer in the Mach-Zender configuration. The Mach-Zender configuration is distinguished from the Michelson configuration in that the two optical paths in the interferometer are only traversed once by light, rather than twice. The implication of this for an optical fiber interferometer is that there must be two optical fiber couplers: one for the input and a second for the output.

In general, Mach-Zender interferometers produce more output power than do Michelson interferometers because they do not rely on reflection for light to be output. On the other hand, Michelson interferometers are twice as sensitive as Mach-Zender interferometers because the light is twice subject to the phase shift induced by the transducer, once for each pass through the interferometer. They are cheaper, too, since only one optical fiber coupler is required, instead of two.

FIG. 1 is a schematic drawing of a Mach-Zender optical fiber interferometric sensor with [2×2] optical fiber couplers 12, 14 at both the input and the output. FIG. 2 is a schematic drawing of a Michelson optical fiber interferometric sensor with a single [2×2] optical fiber coupler 12 serving as both the input and the output. The drawback to the use of [2×2] couplers is that the two interferometric outputs are 180° out of phase from each other, and so there is insufficient information in them to faithfully to reconstruct the signal of interest. In the case of the [2×2] Michelson configuration, there is only one output, and the inability to reconstruct the input is more blatant, although no more real.

To take advantage of passive homodyne demodulation techniques, we can use a [3×3] coupler at the output. FIG. 3 shows a Mach-Zender optical fiber interferometric sensor with a [2×2] optical fiber coupler 12 at the input and a [3×3] optical fiber coupler 24 at the output. FIG. 4 shows a Mach-Zender optical fiber interferometric sensor with a [3×3] optical fiber coupler 24 at the input and a [3×3] optical fiber coupler 28 at the output. One could also construct a Michelson interferometer with a [3×3] coupler serving both as input and output. In this case, there would be only two outputs available, since one of the three strands of glass in the coupler is devoted to the input. This situation is depicted in FIG. 5.

The purpose of the derivation hereinafter is to obtain a theoretical model of the optical power in the output generated by a Mach-Zender optical fiber interferometric sensor like those in FIG. 3 and FIG. 4. Of these two, that using the [2×2] coupler at the input is more efficient. As we shall show, this yields a 1.76 dB improvement in output power.

The model we derive in detail hereinafter is given by equation (5).

$$\frac{|a_k(L)|^2}{2} = D + E \cos\left[\xi(t) + \phi(t) - (k-1)\frac{2}{3}\pi\right]. \quad (5)$$

We shall complete the derivation of the model described in Eqn. (5) for the interferometer whose input is a [2×2] coupler, that of FIG. 3. The completion of the model for the interferometer whose input is a [3×3] coupler, that of FIG. 4, proceeds upon very similar lines, most of which are supplied hereinafter.

In Eqn. (5), k is an index which can take on the values 1, 2, or 3. It specifies which of the three outputs is being considered. D represents a central value, around which the outputs of the interferometer can fluctuate by $\pm E$, at most. Whether or not they actually reach the two extrema at $D+E$ and $D-E$ depends on the signal $\xi(t)$. If it has a very small amplitude, then the cosine will not vary much and so the extreme values will not, in general, be achieved. On the other hand, if $\xi$ has a very large amplitude, more than $\pm \pi$ radians, in particular, then the signals are guaranteed to reach both extrema, possibly many times for each cycle of $\xi$. The term $\phi(t)$ is contributed to the phase by phenomena which are of no interest to us.

In an acoustics application, for example, we would prefer that acoustic waves impinging on the interferometric sensor be the only phenomena to induce a phase shift in the light within the interferometer. Acoustic waves are the signals of interest in this application, and we represent them by $\xi(t)$. Temperature changes also can induce phase shifts within the interferometer, although we do not desire this effect. Thus they contribute to the unwanted phase shift, $\phi(t)$. We often find that the frequency of $\phi(t)$ is much less than the frequency band of the signal of interest, which makes its elimination somewhat easier. With proper construction of the transducer, unwanted effects can be made to produce the same effect on both legs of the interferometer, and this helps to suppress $\phi(t)$, too. In any event, we shall often suppress this term for mathematical convenience, and because it can be removed by filtering, but it is never truly absent.

In FIG. 6 we show graphs of three samples of the kind of outputs described by Eqn. (5). These graphs were drawn by computer. Superimposed over the three interferometric outputs is a plot of the stimulus itself, $\xi(t) = A \sin(2\pi ft)$. This graph is not to the same scale as the other three; it is centered vertically over the middle output for convenience. For the purpose of illustration, we chose to let the signal of interest be a pure tone (a sinusoid) with phase amplitude $A = 5\pi$ radians. The plot does not show the scale of time along the horizontal axis, and so the choice of the frequency f is not specified. By suitable scaling of the time axis, the plot will look the same no matter what f might be. The three plots are offset from one another vertically only to make them easy to see. The model specifies that they will all really be centered around the same central value D.

The choice of amplitude A dictates the amplitude of $\xi$, of course, but it also dictates the number of fringes (complete cycles of $2\pi$ radians, or multiples of $\pi$ in A) in the three outputs between each successive extremum of $\xi$.

As the stimulus passes through zero (its midpoint), it changes at its most rapid rate. Simultaneously, the outputs achieve their highest instantaneous frequencies. When the stimulus stops changing (when it reaches an extremum), the outputs also stop changing and their instantaneous frequency drops to zero. The phase shift is directly proportional to $\xi$. The instantaneous frequency of the interferometric outputs is given by the rate of change of $\xi$.

In FIG. 7 we show another set of sample graphs. They differ from those of FIG. 6 only in the different choice for the amplitude of the stimulus, $A = 10.5\pi$ radians. Note that there are more fringes in this second example than in the first. Yet the locations of the points where the instantaneous frequency reaches its maximum and where it reaches zero have not changed, since these depend only on the frequency f of the stimulus.

It is worth discussing the units of $\xi$ at this point. In the previous paragraph, we treated $\xi$ as measured in radians. $\xi$ is indicative of the amount of strain on the glass in the optical fiber interferometer. The signal of interest, no matter what its natural units, produces differential strain in the two legs of the interferometer, with a consequent differential optical path length. The number of wavelengths of differential path length corresponds to the number of multiples of $2\pi$ radians of phase shift induced in the interferometric output.

The differential equations which describe the amplitudes of the phasors within the [2×2] and [3×3] couplers are given in Sheem, "Fiberoptic Gyroscope with [3×3] Directional Coupler", *Appl. Phys. Lett.*, 37(10), pp.869-871, Nov. 15, 1980; Sheem, "Optical Fiber Interferometers with [3×3] Directional Couplers; Analysis", *J. Appl. Phys.*, 52(6), pp.3865-3872, June 1981. Before presenting the differential equations themselves, we first establish some notation.

The fibers will be denoted by numbers 1 and 2 for the [2×2] case and 1, 2, and 3 for the [3×3] case. We shall denote electrical field intensities by phasor amplitudes. The electrical field phasor $a_k(z)$ within fiber k is a function of position z measured from the point where light enters the coupler. For instance, $a_1(z)$ is the electric field in optical fiber 1 at a distance z from the entry point. The differential equations include coupling coefficients $K_{ij}$ between fibers i and j. For example, $K_{12}$ is the coupling coefficient between optical fibers 1 and 2 within a coupler. For the [2×2] case, the differential equations given by Sheem are $$\frac{da_1(z)}{dz} + jK_{12}a_2(z) = 0 \tag{6}$$

and $$\frac{da_2(z)}{dz} + jK_{12}a_1(z) = 0. \tag{7}$$

For the [3×3] case, they are very similar:

$$\frac{da_1(z)}{dz} + jK_{12}a_2(z) + jK_3a_3(z) = 0 \tag{8}$$

$$\frac{da_2(z)}{dz} + jK_{23}a_3(z) + jK_{21}a_1(z) = 0, \tag{9}$$

and $$\frac{da_3(z)}{dz} + jK_{31}a_1(z) + jK_{32}a_2(z) + 0. \tag{10}$$

If we compare these equations with the general result given in Snyder, we note two differences. Firstly, Sheem '80 and '81 renames Snyder's coupling coefficients $C_{js}$ and brings them to the left-hand side of the equations as $K_{ij}$. [Snyder, "Coupled-Mode Theory for Optical Fibers", *J. Opt.Soc. Am.*, 62(11), pp. 1267–1277, Nov. 1982.]. This is a minor difference in notation, which we shall nonetheless adopt in order to keep this development similar to Sheem's.

A more important difference is the dropping of the term $j\beta_j a_j$ in Snyder. The effect of the missing term is zero in the case where the three fibers are identical. That they all are identical is a reasonable approximation in a [3×3] optical fiber coupler. Hereinafter, we provide details of the solution of the differential equations where this approximation is valid.

It will be noted that in equations (6) and (7) there is little point in appending subscripts to the coupling coefficient $K_{12}$, so we shall replace it with coupling coefficient K and rewrite these equations as $$\frac{da_1(z)}{dz} + jKa_2(z) = 0 \tag{11}$$

and $$\frac{da_2(z)}{dz} + jKA_1(z) = 0. \tag{12}$$

Also, in equations (8) through (10) there are three distinct coupling coefficients, $K_{12}$, $K_{23}$, and $K_{31}$. Strictly speaking, the coupling between each pair of optical fibers in a [3×3] coupler may be different. However, in order to make the mathematics tractable, we shall assume that the coefficients all are equal to the same value, K. This would obviously be a valid assumption for three fibers arranged equidistant from each other, as if at the vertices of an equilateral triangle. However, it is not valid for three fibers aligned in a plane. As it turns out, this assumption leads to a good description of the actual behavior of the interferometers we have built in the laboratory. A more elaborate theory could be created treating the coupling coefficients as random variables dependent on the position z, something we have not found necessary to get useful results, but which might assist in optimization of a practical system.

Replacing all coefficients $K_{ij}$ by K, equations (8) through (10) simplify to $$\frac{da_1(z)}{dz} + jKa_2(z) + jKa_3(z) = 0, \tag{13}$$

$$\frac{da_2(z)}{dz} + jKa_3(z) + jKa_1(z) = 0, \tag{14}$$

and $$\frac{da_3(z)}{dz} + jKa_1(z) + jKa_2(z) = 0. \tag{15}$$

Sheem '81 [p. 3865] give the solutions to equations (11) and (12) as $$a_1(z) = a_1(0) \cos(Kz) - ja_2(0) \sin(Kz) \tag{16}$$

and $$a_2(z) = a_2(0) \cos(Kz) - ja_1(0) \sin(Kz). \tag{17}$$

We can verify that these are indeed solutions by differentiating equations (16) and (17) and substituting into equations (11) and (12). Because this is straightforward, we omit this verification.

The solution to equations (13) through (15) is also given by Sheem '80 [p. 869]:

$$a_1(z) = c_1 e^{jKz} + de^{-j2Kz} \tag{18}$$

$$a_2(z) = c_2 e^{jKz} + de^{-j2Kz}, \tag{19}$$

and $$a_3(z) + c_3 e^{jKz} + de^{-j2Kz} \tag{20}$$

where $$c_1 + c_2 + c_3 = 0. \tag{21}$$

We can verify that equations (18) through (20) are indeed solutions of differential equations (13) through (15) by taking their derivatives and substituting them into the differential equations. Because this is straightforward, we omit the verification. Note, however, that Eqn. (21) is useful in performing the verification.

Eqns. (11) and (12) for the [2×2] coupler and Eqns (18 through 20) for the [3×3] coupler are general. Particular solutions depend on the initial conditions. At the input to our Mach-Zender interferometer, we have $$a_1(0) = A \tag{22}$$

$$a_2(0) = a_3(0) = 0. \tag{23}$$

This represents the situation where a laser of constant amplitude A injects light into one leg of the fiber and the other leg (in the case of a [2×2] coupler) or both other legs (in the case of a [3×3] coupler) are unilluminated.

We shall analyze both these situations before moving on to the next stage, which entails taking the outputs from either a [2×2] coupler or a [3×3] coupler and using them as inputs to a second coupler, a [3×3] coupler. Either of these configurations comprises a Mach-Zender interferometer with a [3×3] coupler as an output.

First we consider the case where the input to the interferometer consists of a [2×2] coupler. Evaluating Eqns (16) and (17) we get $$a_1(z) = A \cos(Kz) \quad (24)$$

and $$a_2(z) = -jA \sin(Kz). \quad (25)$$

At the outputs of the coupler, $z=L$ and so the average power represented by these two outputs is given by $$P_{out1} = \frac{|a_1(L)|^2}{2} \quad (26)$$

$$P_{out1} = \frac{1}{2} a_1(L) a_1^*(L) \quad (27)$$

$$P_{out1} = \frac{A^2}{2} \cos^2(KL) \quad (28)$$

and $$P_{out2} = \frac{|a_2(L)|^2}{2} \quad (29)$$

$$P_{out2} = \frac{1}{2} a_2(L) a_2^*(L) \quad (30)$$

$$P_{out2} = \frac{1}{2} [(-j)A\sin(KL)][jA\sin(KL)] \quad (31)$$

$$P_{out2} = \frac{A^2}{2} \sin^2(KL). \quad (32)$$

The sum of the average power emitted by each output of the coupler is a constant, as should be expected from the law of conservation of energy if the couplers are assumed to be lossless. (Although couplers are not 100% lossless, this approximation is quite good.)

We next consider the case where the input to the interferometer consists of a [3×3] coupler. We shall suppose that laser light of amplitude A is injected into input 1; inputs 2 and 3 will be left dark. Evaluating equations (18) through (20) at $z=0$ we get $$a_1(0) = A = c_1 + d \quad (33)$$

$$a_2(0) = 0 = c_2 + d \quad (34)$$

and $$a_3(0) = 0 = c_3 + d. \quad (35)$$

So $$c_1 = A - d \quad (36)$$

and $$c_2 = c_3 = -d. \quad (37)$$

If we sum the three equations (33) through (35) we get $$A = c_1 + c_2 + c_3 + 3d = 3d \quad (38)$$

where we once again have used equation (21). From this, we see that $$d = \frac{A}{3} \quad (39)$$

and substituting this into equations (36) and (37), we get $$\begin{aligned} c_1 &= A - d \\ &= A - \frac{A}{3} \\ &= \frac{2}{3} A \end{aligned} \quad (40)$$

and $$\begin{aligned} c_2 = c_3 &= -d \\ &= -\frac{A}{3}. \end{aligned} \quad (41)$$

Substituting equations (39) through (41) into equations (18) through (20) yields the particular solutions $$a_1(z) = \tfrac{2}{3} A e^{jKz} + \tfrac{1}{3} A e^{-j2Kz} \quad (42)$$
$$a_2(z) = -\tfrac{1}{3} A e^{jKz} + \tfrac{1}{3} A e^{-j2Kz} \quad (43)$$

and $$\begin{aligned} a_3(z) &= -\tfrac{1}{3} A e^{jKz} + \tfrac{1}{3} A e^{-j2Kz} \\ &= a_2(z). \end{aligned} \quad (44)$$

Note that outputs 2 and 3 are identical, which intuitively they should be, since they have not yet been distinguished from one another in any way except by the arbitrary assignment of index numbers to them.

The average power contained in output 1 is given by $$\begin{aligned} P_{out1} &= \frac{|a_1(L)|^2}{2} \\ &= \frac{a_1(L) a_1^*(L)}{2}. \end{aligned} \quad (45)$$

Substituting $z=L$ into Eqn. (42) and rewriting Eqn. (45) yields $$\begin{aligned} P_{out1} &= \frac{1}{2} \frac{A}{3}(2e^{jKL} + e^{-j2KL}) \frac{A}{3}(2e^{-jKL} + e^{j2KL}) \\ &= \frac{A^2}{18} (4 + 1 + 2e^{jKL}e^{j2KL} + 2e^{-j2KL}e^{-jKL}) \\ &= \frac{A^2}{18} [5 + 2(e^{j3KL} + e^{-j3KL})]. \end{aligned} \quad (46)$$

We can replace the complex exponentials with trigonometric functions as follows:

$$\begin{aligned} P_{out1} &= \frac{A^2}{18} \left[ 5 + 4 \frac{(e^{j3KL} + e^{-j3KL})}{2} \right] \\ &= \frac{A^2}{18} [5 + 4\cos(3KL)]. \end{aligned} \quad (47)$$

similarly, the power in outputs 2 and 3 is given by $$\begin{aligned} P_{out2} = P_{out3} &= \frac{|a_2(L)|^2}{2} \\ &= \frac{a_2(L) a_2^*(L)}{2} \end{aligned} \quad (48)$$

Substituting $z=L$ into Eqn. (44) gives $$P_{out2} = P_{out3} = \frac{1}{2} \frac{A}{3} (-e^{jKL} + e^{-j2KL}) \frac{A}{3} (-e^{-jKL} + e^{j2KL}) \quad (49)$$

-continued $$= \frac{A^2}{18} [1 + 1 - e^{j3KL} - e^{-j3KL}]$$

We can replace the complex exponentials with trigonometric functions as follows:

$$P_{out2} = P_{out3} = \frac{A^2}{18} \left[ 2 - 2 \frac{(e^{j3KL} + e^{-j3KL})}{2} \right] \quad (50)$$

$$= \frac{A^2}{9} [1 - \cos 3KL].$$

We now have obtained expressions for the output of both a [2×2] coupler and a [3×3] coupler when they are provided with a laser input on only one optical fiber. These are the conditions at the input of the interferometer. Both outputs of the [2×2] coupler will comprise a leg of the interferometer. In the case of the [3×3] coupler, we arbitrarily pick two of the three available outputs of the coupler for the two legs of the interferometer. The third output is not used. To eliminate back reflection into the laser (a cause of instability in the laser and consequent phase noise), we can put the end to the unused fiber into some index matching fluid. Any light emitted from this strand of the output of the coupler will be transmitted into the fluid, from which it will be more difficult for it to reflect back into the fiber.

We next derive the conditions under which the couplers split the input power evenly over the outputs. To get an even split, we require that the power out of each leg of the interferometer be equal. For a [2×2] coupler, this means that $$P_{out1} = P_{out2}. \quad (51)$$

Substituting Eqns. (28) and (32) into Eqn. (51) yields $$\frac{A^2}{2} \cos^2 KL = \frac{A^2}{2} \sin^2 KL \quad (52)$$

The common factor $$\frac{A^2}{2}$$

can be divided into both sides, so $$\cos^2 KL = \sin^2 KL \quad (53)$$

This equation is true only when $$KL = \frac{\pi}{4} + n\frac{\pi}{2} \quad (54)$$

where n is an arbitrary integer. For example, n might be 0, in which case the condition is that KL=45°. Eqns. (24) and (25) can be rewritten with this choice of n and with z=L as $$a_{1,out} = \frac{A}{\sqrt{2}} \quad (55)$$

and $$a_{2,out} = -j\frac{A}{\sqrt{2}} \quad (56)$$

-continued $$= \frac{A}{\sqrt{2}} e^{-j\frac{\pi}{2}}.$$

Other choices for n will result in different signs, and the net effect will be that $a_{1,out}$ will either lead $a_{2,out}$ by 90° or vice versa. This is tantamount to inverting the choice of labels for the two legs of the coupler. When these two signals are shifted in phase by some differential transducer in the arms of the interferometer, this initial static phase difference will cease to be of any consequence at all since it will be augmented by other sources of phase shift. These other sources include a quasi-static phase shift due to temperature, pressure, and other effects, and by a dynamic phase shift due to the physical quantity we really want to measure with our transducer.

Turning now to the question of how to obtain even splitting from a [3×3] coupler, we must have $$P_{out1} = P_{out2} = P_{out3} \quad (57)$$

Note from Eqn. (49) that the power in output legs 2 and 3 is equal since the electric fields in these legs are identical. Setting Eqns. (47) and (50) equal to one another, we get $$\frac{A^2}{18} (5 + 4\cos 3KL) = \frac{A^2}{9} (1 - \cos 3KL). \quad (58)$$

Dividing through on both sides by the common factor $A^2/9$ and multiplying both sides by 2 gives $$5 + 4 \cos 3KL = 2(1 - \cos 3KL). \quad (59)$$

Gathering like terms, we get $$2 - 5 = 4 \cos 3KL + 2 \cos 3KL \quad (60)$$

$$6 \cos 3KL = -3 \quad (61)$$

$$\cos 3KL = -\tfrac{1}{2} \quad (62)$$

Eqn. (62) can only be satisfied when $$3KL = \pi \pm \frac{\pi}{3} = n2\pi \quad (63)$$

$$KL = \frac{\pi}{3} \pm \frac{\pi}{9} + n\frac{2\pi}{3} \quad (64)$$

where n is an arbitrary integer. For example, n might be 0, in which case the conditions are that KL=40° or KL=80°.

Summarizing what we have to this point, the electric fields from the [2×2] coupler are given by Eqns. (24) and (25). The corresponding expressions for the power contained in each output are given in Eqns. (28) and (32). The electric fields from the [3×3] coupler are given by Eqns. (42) through (44). The corresponding expressions for the power contained in each output are given in Eqns. (47) and (50).

We shall now consider what happens when the light from the input coupler (either [2×2] or [3×3]) travels through the two legs of the interferometer to the output coupler (which is a [3×3] coupler, always). We shall refer to the input to leg k of the output coupler as $a_k(z)$ where z is the distance from the point where leg k enters the output coupler. Note that we have redefined the origin of the z-axis. Earlier, $z=0$ defined the input to the first optical fiber coupler in the interferometer. Now it defines the input to the second coupler, the one which terminates the interferometer.

First let us consider what happens when the laser light is split by a [2×2] input coupler. After travelling along the two legs of the interferometer, the electric fields in each leg will have undergone some amount of phase shift. Let us suppose that we have configured the interferometer as shown in FIG. 3.

Output 1 of the input coupler is fed to input 2 of the output coupler. Output 2 of the input coupler is fed to input 3 of the output coupler. Input 1 of the output coupler is left dark. No matter whether the phase in input 2 of the output coupler initially led that in input 3 by 90° or vice versa, at the point where the two optical signals enter the [3×3] coupler, we can say that the light in the input to leg 2 of the [3×3] coupler has been shifted through an angle $\phi$ and that in the input to leg 3 has been shifted through an angle $\eta$. Thus, the light waves in these two legs have phasor representations $$a_2(0) = A\cos(KL)e^{j\phi} \quad (65)$$
$$= B_2 e^{j\phi}$$

and $$a_3(0) = -jA\sin(KL)e^{j\eta} \quad (66)$$
$$= B_3 e^{j\eta}$$

where $$B_2 = A \cos (KL) \quad (67)$$

and where $$B_3 = -jA \sin (KL). \quad (68)$$

Now let us consider the output from a [3×3] input coupler. After travelling along the two legs of the interferometer, the electric fields in each leg will have undergone some amount of phase shift. Let us suppose that we have configured the interferometer as shown in FIG. 4. Output 2 of the input coupler is fed to input 2 of the output coupler. Output 3 of the input coupler is fed to input 3 of the output coupler. Output 1 of the input coupler is left disconnected and input 1 of the output coupler is left dark. The light in input 2 of the output coupler initially was in phase with that in input 3, but at the point where the two optical signals enter the [3×3] coupler, their relative phases have been shifted. We can say that the light in the input to leg 2 of the [3×3] coupler has been shifted through an angle $\phi$ and that in the input to leg 3 has been shifted through an angle $\eta$. These shifts are partly due to the quasi-static phase difference induced by temperature, pressure, and other effects and partly due to the dynamic phase shift which we are trying to measure. Multiplying Eqn. (43) by the phase shift $e^{j\phi}$ gives us the input to the [3×3] coupler. Input 2 of the output coupler thus has phasor representation $$a_2(0) = \left[ -\frac{1}{3} Ae^{jKL} + \frac{1}{3} Ae^{-j2KL} \right] e^{j\phi} \quad (69)$$

-continued
$$= -\frac{A}{3} [e^{jKL} - e^{-j2KL}] e^{j\phi}.$$

We can remove a complex exponential factor thus:

$$a_2(0) = -\frac{A}{3} \left[ e^{-j\frac{KL}{2}} \right] \left[ e^{j\frac{3KL}{2}} - e^{-j\frac{3KL}{2}} \right] e^{j\phi} \quad (70)$$

$$= -j\frac{2A}{3} e^{-j\frac{KL}{2}} \left[ \frac{e^{j\frac{3KL}{2}} - e^{-j\frac{3KL}{2}}}{j2} \right] e^{j\phi}.$$

Finally, we can simplify this by replacing the difference of the two complex exponentials by a trigonometric function.

$$a_2(0) = -j\frac{2A}{3} \sin\left(\frac{3KL}{2}\right) e^{-j\frac{KL}{2}} e^{j\phi} \quad (71)$$

$$= B_2 e^{j\phi}.$$

In this equation we define $$B_2 = -j\frac{2A}{3} \sin\left(\frac{3KL}{2}\right) e^{-j\frac{KL}{2}}, \quad (72)$$

which is a different definition than the one we used when a [2×2] coupler served as the input coupler of the interferometer.

In a very similar manner, we can multiply the equation for input number 3 (Eqn.(44)) by the phase shift which affects it, $e^{j\eta}$. This gives us $$a_3(0) = \left[ -\frac{1}{3} Ae^{jKL} + \frac{1}{3} Ae^{-j2KL} \right] e^{j\eta} \quad (73)$$

$$= -j\frac{2A}{3} \sin\left(\frac{3KL}{2}\right) e^{-j\frac{KL}{2}} e^{j\eta}$$

$$= B_3 e^{j\eta}.$$

From this equation, we see that
$$B_3 = B_2. \quad (74)$$

If we compare Eqn. (65) to Eqn. (71) and Eqn. (66) to Eqn. (73), we see that the form of the inputs to the second optical fiber coupler is the same whether we use a [2×2] coupler or a [3×3] coupler at the input to the interferometer. The only difference is in the definitions of $B_2$ and $B_3$ in each case. For the [2×2] coupler at the input, these are defined by Eqns. (67) and (68); for the [3×3] coupler, they are defined by Eqns. (72) and (74). In fact, if the input coupler is a [3×3] coupler, then $B_2 = B_3$.

Our next goal is to find the outputs of the [3×3] coupler when two inputs receive light (legs 2 and 3) and one is left dark (leg 1), as illustrated in FIG. 3 and in FIG. 4. We will find this output in terms of $B_2$ and $B_3$ so that the results may readily be applied to either of two cases: a [2×2] coupler at the input to the interferometer or a [3×3] coupler at the input. Earlier, in discussing what happens at the input coupler, we used L to denote the length of the coupler. We shall continue to use this notation here, but one should not infer that the length of the various couplers in a system must be the same. Later, when we combine equations that include the length of more than one coupler, we shall take care to use symbols that distinguish one length from another.

Because the output coupler is a [3×3] coupler, the electric field phasors are specified by Eqns. (18) through (20). We would like to find the constants $c_k$ and d in these equations, for then we could evaluate the equations at $z=L$, where the light leaves the terminating [3×3] coupler. Evaluating each of these equations at the point $z=0$, where signals are injected into the coupler and are known, we get $$a_1(0) = c_1 + d = 0, \quad (75)$$

$$a_2(0) = c_2 + d = B_2 e^{j\phi}, \quad (76)$$

and $$a_3(0) = c_3 + d = B_3 e^{j\eta}. \quad (77)$$

Summing Eqns. (75) through (77) gives $$\sum_{k=1}^{3} a_k(0) = 3d + \sum_{k=1}^{3} c_k \quad (78)$$

$$= B_2 e^{j\phi} + B_3 e^{j\eta}.$$

This invention is not limited to the preferred embodiment and alternatives heretofore described, to which variations and improvements may be made, without departing from the scope of protection of the present patent and true spirit of the invention, the characteristics of which are summarized in the following claims. Making use of Eqn (21), $$\sum_{k=1}^{3} a_k(0) = 3d = B_2 e^{j\phi} + B_3 e^{j\eta}. \quad (79)$$

So $$d = \frac{1}{3} [B_2 e^{j\phi} + B_3 e^{j\eta}]. \quad (80)$$

Using Eqn (80) in Eqns (75) through (77) lets us calculate the constants $c_k$.

$$c_1 + d = c_1 + \tfrac{1}{3}[B_2 e^{j\phi} + B_3 e^{j\eta}] = 0. \quad (81)$$

$$c_1 = -\tfrac{1}{3}[B_2 e^{j\phi} + B_3 e^{j\eta}]. \quad (82)$$

Also $$c_2 + d = B_2 e^{j\phi} \quad (83)$$

so $$c_2 = B_2 e^{j\phi} - \tfrac{1}{3}[B_2 e^{j\phi} + B_3 e^{j\eta}] \quad (84)$$
$$= \tfrac{1}{3}[2 B_2 e^{j\phi} - B_3 e^{j\eta}].$$

Finally, $$c_3 + d = B_3 e^{j\eta}. \quad (85)$$

So $$c_3 = B_3 e^{j\eta} - \tfrac{1}{3}[B_2 e^{j\phi} + B_3 e^{j\eta}] \quad (86)$$

$$= -\tfrac{1}{3}[B_2 e^{j\phi} - 2 B_3 e^{j\eta}].$$

We now have obtained expressions for all the constants in Eqns (18) through (20). Replacing the constants by these expressions gives us the ability to compute the output power at the end of the coupler, where $z = L$.

$$a_1(L) = -\tfrac{1}{3}[B_2 e^{j\phi} + B_3 e^{j\eta}]e^{jKL} + \tfrac{1}{3}[B_2 e^{j\phi} + B_3 e^{j\eta}]e^{-j2KL} \quad (87)$$

This can be rearranged to give $$a_1(L) = -\frac{B_2}{3} e^{j\phi} \left[ e^{-j\frac{KL}{2}} \right] \left[ e^{j\frac{3KL}{2}} - e^{-j\frac{3KL}{2}} \right] - \quad (88)$$

$$\frac{B_3}{3} e^{j\eta} e^{-j\frac{KL}{2}} \left[ e^{j\frac{3KL}{2}} - e^{-j\frac{3KL}{2}} \right]$$

$$= -j\frac{2}{3} [B_2 e^{j\phi} + B_3 e^{j\eta}] \sin\left(\frac{3KL}{2}\right) e^{-j\frac{KL}{2}}$$

The complex conjugate of this is $$a_1^*(L) = j\frac{2}{3} [B_2^* e^{-j\phi} + B_3^* e^{-j\eta}] \sin\left(\frac{3KL}{2}\right) e^{j\frac{KL}{2}}. \quad (89)$$

We get the power in strand 1 at the output point $z = L$ by multiplying the complex conjugates and dividing by 2.

$$\frac{|a_1(L)|^2}{2} = \frac{1}{2} a_1(L) a_1^*(L) \quad (90)$$

$$= \frac{1}{2} \left(\frac{2}{3}\right)^2 [B_2 B_2^* + B_3 B_3^* + B_2 B_3^* e^{j(\phi-\eta)} +$$

$$B_2^* B_3 e^{-j(\phi-\eta)}] \sin^2\left(\frac{3KL}{2}\right).$$

The same procedure applied to output 2 gives $$a_2(L) = c_2 e^{jKL} + d e^{-j2KL} \quad (91)$$

$$= \tfrac{1}{3}[2B_2 e^{j\phi} - B_3 e^{j\eta}]e^{jKL} + \tfrac{1}{3}[B_2 e^{j\phi} + B_3 e^{j\eta}]e^{-j2KL}.$$

This can be rearranged a little to give a marginally improved form.

$$a_2(L) = \frac{B_2}{3} e^{j\phi} [2 e^{jKL} + e^{-j2KL}] - \frac{B_3}{3} e^{j\eta} [e^{jKL} - e^{-j2KL}] \quad (92)$$

The complex conjugate of this is $$a_2^*(L) = \quad (93)$$

$$\frac{B_2^*}{3} e^{-j\phi}[2 e^{-jKL} + e^{j2KL}] - \frac{B_3^*}{3} e^{-j\eta}[e^{-jKL} - e^{j2KL}].$$

The power in this output is $$\frac{|a_2(L)|^2}{2} = \frac{1}{2} a_2(L) a_2^*(L) \tag{94}$$

$$= \frac{1}{2} \Bigg\{ \left(\frac{1}{3}\right)^2 B_2 B_2^*[4 + 1 + 2e^{j3KL} + 2e^{-j3KL}] +$$

$$\left(\frac{1}{3}\right)^2 B_3 B_3^*[1 + 1 - e^{j3KL} - e^{-j3KL}] -$$

$$\left(\frac{1}{3}\right)^2 B_2 B_3^* e^{j(\phi-\eta)} [2 - 1 - 2e^{j3KL} + e^{-j3KL}] -$$

$$\left(\frac{1}{3}\right)^2 B_2^* B_3 e^{-j(\phi-\eta)} [2 - 1 +$$

$$e^{j3KL} - 2e^{-j3KL}] \Bigg\}$$

We can simplify this expression by replacing certain pairs of complex exponentials with trigonometric equivalents.

$$\frac{|a_2(L)|^2}{2} = \frac{1}{18} \{ B_2 B_2^* [5 + 4\cos(3KL)] + \tag{95}$$

$$2B_3 B_3^*[1 - \cos(3KL)] - B_2 B_3^* e^{j(\phi-\eta)}[1 - 2e^{j3KL} + e^{-j3KL}] -$$

$$B_2^* B_3 e^{-j(\phi-\eta)}[1 + e^{j3KL} - 2e^{-j3KL}]\}.$$

Now we turn to the last of the three outputs, number 3.

$$a_3(L) = c_3 e^{jKL} + d e^{-j2KL} \tag{96}$$

$$= -\tfrac{1}{3}[B_2 e^{j\phi} - 2B_3 e^{j\eta}] e^{jKL} + \tfrac{1}{3}[B_2 e^{j\phi} + B_3 e^{j\eta}] e^{-j2KL}.$$

We can rewrite this as $$a_3(L) = -\frac{B_2}{3} e^{j\phi}[e^{jKL} - e^{-j2KL}] + \frac{B_3}{3} e^{j\eta}[2e^{jKL} + e^{-j2KL}]. \tag{97}$$

Comparing this with Eqn (92), we see that they are identical except that $B_2$ and $B_3$ are interchanged, and $\phi$ and $\eta$ also are interchanged. This permits us to write the power in output leg 3 by performing the same interchange on Eqn (95).

$$\frac{|a_3(L)|^2}{2} = \frac{1}{18} \{ 2B_2 B_2^*[1 - \cos(3KL)] + \tag{98}$$

$$+ B_3 B_3^*[5 + 4\cos(3KL)] - B_2 B_3^* e^{j(\phi-\eta)}[1$$

$$e^{j3KL} - 2e^{-j3KL}] -$$

$$B_2^* B_3 e^{-j(\phi-\eta)}[1 - 2e^{j3KL} + e^{-j3KL}]\}.$$

Eqns (90), (95), and (98) are general solutions to the power in the three outputs of an optical fiber interferometer with one dark input. Knowing the values of $B_2$ and $B_3$ as well as the product of K and L permits one to find specific solutions as functions of $\phi$ and $\eta$.

As mentioned before, once we start to combine results of the analysis of more than one coupler, we must be careful to distinguish between the coupling coefficients K and the coupling interaction lengths L of each. Our next task is to perform this combination for the two cases where the output [3×3] coupler gets signals from an interferometer with either a [2×2] coupler or a [3×3] coupler at its input. We shall designate as $K_i$ and $L_i$ the parameters which apply to the input coupler, and we shall designate as $K_o$ and $L_o$ the parameters which apply to the output coupler. We shall denote by $z_i$ the position in the input coupler, and as $z_o$ the position in the output coupler.

For the [2×2] coupler at the input to the interferometer, we can therefore rewrite Eqns (65) and (66) as $$B_2 e^{j\phi} = a_2(z_0)|_{z_0=0} = A \cos(K_i L_i) e^{j\phi} \tag{99}$$

and $$B_3 e^{j\eta} = a_3(z_0)|_{z_0=0} = -jA \sin(K_i L_i) e^{j\eta}. \tag{100}$$

We now compute the various products of $B_k$ which appear in Eqn (90),(95), and (98). By using the trigonometric identity.

$$\cos(2\theta) = 2\cos^2(\theta) - 1. \tag{101}$$

we get $$B_2 B_2^* = A^2 \cos^2(K_i L_i) \tag{102}$$

$$= \frac{A^2}{2}[\cos(2K_i L_i) + 1]$$

By using the trigonometric identity $$\cos(2\theta) = 1 - 2\sin^2(\theta). \tag{103}$$

we get $$B_3 B_3^* = A^2 \sin(K_i L_i) \tag{104}$$

$$= \frac{A^2}{2}[1 - \cos(2K_i L_i)].$$

By using the trigonometric identity $$\sin(2\theta) = 2\sin(\theta)\cos(\theta). \tag{105}$$

we get $$B_2 B_3^* = jA^2 \sin(K_i L_i)\cos(K_i L_i) \tag{106}$$

$$= -j\frac{A^2}{2}\sin(2K_i L_i).$$

Finally, we can use the same trigonometric identity to get $$B_2^* B_3 = jA^2 \sin(K_i L_i)\cos(K_i L_i) \tag{107}$$

$$= -j\frac{A^2}{2}\sin(2K_i L_i).$$

Substituting them into Eqn (90) gives $$\frac{|a_1 L_o)|^2}{2} = \tag{108}$$

$$\frac{1}{2}\left(\frac{2}{3}\right)^2 \left\{ \begin{array}{l} \frac{A^2}{2}[\cos(2K_iL_i) + 1] + \\ \frac{A^2}{2}[1 - \cos(2K_iL_i)] + \\ j\frac{A^2}{2}\sin(2K_iL_i)e^{j(\phi-\eta)} - \\ j\frac{A^2}{2}\sin(2K_iL_i)e^{-j(\phi-\eta)} \end{array} \right\} \sin^2\left(\frac{3K_oL_o}{2}\right).$$

In this expression, the braces do not denote a matrix of values. They are used in order to keep the lengthy summation within from sprawling across the page. We shall use braces in this manner whenever it lends clarity to the expressions. We can rewrite the expression as $$\frac{|a_1(L_o)|^2}{2} = \frac{2}{9}A^2\left\{1 - \sin(2K_iL_i)\left[\frac{e^{j(\phi-\eta)} - e^{-j(\phi-\eta)}}{j2}\right]\right\}\sin^2\left(\frac{3K_oL_o}{2}\right) \quad (109)$$

$$= \frac{A^2}{9}[1 - \sin(2K_iL_i)\sin(\phi - \eta)][1 - \cos(3K_oL_o)].$$

For the power in the second output leg, we get $$\frac{|a_2(L_o)|^2}{2} = \qquad (110)$$

$$\frac{A^2}{18}\left\{ \begin{array}{l} \frac{1}{2}[\cos(2K_iL_i) + 1][5 + 4\cos(3K_oL_o)] + \\ \frac{1}{2}2[1 - \cos(2K_iL_i)][1 - \cos(3K_oL_o)] - \\ -\frac{j}{2}\sin(2K_iL_i)e^{j(\phi-\eta)}[1 - 2e^{j3K_oL_o} + e^{-j3K_oL_o}] + \\ \frac{j}{2}\sin(2K_iL_i)e^{-j(\phi-\eta)}[1 + e^{j3k_oL_o} - 2e^{-j3K_oL_o}] \end{array} \right\}$$

We can remove the factor of ½ from within the admittedly forbidding-looking expression within the brackets, multiply out the terms within the brackets, and get ready to replace the complex exponential functions with trigonometric functions.

$$\frac{|a_2(L_o)|^2}{2} = \qquad (111)$$

$$\frac{A^2}{36}\left\{ \begin{array}{l} 5\cos(2K_iL_i) + 4\cos(3K_oL_o) + 5 + \\ 4\cos(2K_iL_i)\cos(3K_oL_o) + 2 - 2\cos(2K_iL_i) - \\ 2\cos(3K_oL_o) + 2\cos(2K_iL_i)\cos(3K_oL_o) + \\ 2\sin(2K_iL_i)\left[\frac{e^{j(\phi-\eta)} - e^{-j(\phi-\eta)}}{2j}\right] - \\ 4\sin(2K_iL_i)\left[\frac{e^{j(\phi-\eta+3K_oL_o)} - e^{-j(\phi-\eta+3K_oL_o)}}{2j}\right] + \\ 2\sin(2K_iL_i)\left[\frac{e^{j(\phi-\eta-3K_oL_o)} - e^{-j(\phi-\eta-3K_oL_o)}}{2j}\right] \end{array} \right\}.$$

Summing like terms within the brackets and factoring some terms gives a simpler, though still quite formidable, form $$\frac{|a_2(L_o)|^2}{2} = \qquad (112)$$

$$\frac{A^2}{36}\left\{ \begin{array}{l} 7 + 3\cos(2K_iL_i) + 2\cos(3K_oL_o) + \\ 6\cos(2K_iL_i)\cos(3K_oL_o) + \\ 2\sin(2K_iL_i)[\sin(\phi - \eta) - 2\sin(\phi - \\ \eta + 3K_oL_o) + \sin(\phi - \eta - 3K_oL_o)] \end{array} \right\}$$

This can be further rewritten as $$\frac{|a_2(L_o)|^2}{2} = \frac{A^2}{36}\left\{ \begin{array}{l} 7 + 3\cos(2K_iL_i) + 2\cos(3K_oL_o) + 6\cos(2K_iL_i)\cos(3K_oL_o) + \\ 2\sin(2K_iL_i)\left[\begin{array}{l} \sin(\phi - \eta) - \\ 2\sin(\phi - \eta)\cos(3K_oL_o) - \\ 2\cos(\phi - \eta)\sin(3K_oL_o) + \\ \sin(\phi - \eta)\cos(3K_oL_o) - \cos(\phi - \eta) - \\ \cos(\phi - \eta)\sin(3K_oL_o) \end{array}\right] \end{array} \right\} \qquad (113)$$

$$= \frac{A^2}{36}\left\{ \begin{array}{l} 7 + 3\cos(2K_iL_i) + 2\cos(3K_oL_o) + 6\cos(2K_iL_i)\cos(3K_oL_o) + \\ 2\sin(2K_iL_i)\left[\begin{array}{l} \sin(\phi - \eta) - \\ \sin(\phi - \eta)\cos(3K_oL_o) - 3\cos(\phi - \eta)\sin(3K_oL_o) \end{array}\right] \end{array} \right\}.$$

Now finding the power in the third output leg is just as tedious as it was to find the power in the second output leg. We start with Eqn (98), using the products found in Eqns (102) through (107).

$$\frac{|a_3(L)|^2}{2} = \qquad (114)$$

-continued $$\frac{A^2}{36}\left\{\begin{array}{l}2[\cos(2K_iL_i)+1][1-\cos(3K_oL_o)]+\\ [1-\cos(2K_iL_i)][5+4\cos(3K_oL_o)]-\\ j\sin(2K_iL_i)e^{j(\phi-\eta)}[1+e^{j3K_oL_o}-2e^{-j3K_oL_o}]+\\ j\sin(2K_iL_i)e^{-j(\phi-\eta)}[1-2e^{j3K_oL_o}+e^{-j3K_oL_o}]\end{array}\right\}.$$

Multiplying this out and replacing the complex exponentials with equivalent trigonometric functions gives $$\frac{|a_3(L)|^2}{2}= \tag{115}$$

$$\frac{A^2}{36}\left\{\begin{array}{l}2\cos(2K_iL_i)+2-2\cos(3K_oL_o)-2\cos(2K_iL_i)\cos(3K_oL_o)+\\ 5-5\cos(2K_iL_i)+4\cos(3K_oL_o)-4\cos(2K_iL_i)\cos(3K_oL_o)+\\ \sin(2K_iL_i)[2\sin(\phi-\eta)+2\sin(\phi-\eta-3K_oL_o)-4\sin(\phi-\eta-3K_oL_o)]\end{array}\right\}.$$

This can be further simplified to $$\frac{|a_3(L)|^2}{2}= \tag{116}$$

$$\frac{A^2}{36}\left\{\begin{array}{l}7-3\cos(2K_iL_i)+2\cos(3K_oL_o)-6\cos(2K_iL_i)\cos(3K_oL_o)+\\ 2\sin(2K_iL_i)\begin{bmatrix}\sin(\phi-\eta)+\\ \sin(\phi-\eta)\cos(3K_oL_o)+\\ \cos(\phi-\eta)\sin(3L_oL_o)-\\ 2\sin(\phi-\eta)\cos(3K_oL_o)+\\ 2\cos(\phi-\eta)\sin(3K_oL_o)\end{bmatrix}\end{array}\right\}.$$

Finally, we get the equation $$\frac{|a_3(L)|^2}{2}=\frac{A^2}{36}\left\{\begin{array}{l}7-3\cos(2K_iL_i)+2\cos(3K_oL_o)-6\cos(2K_iL_i)\cos(3K_oL_o)+\\ 2\sin(2K_iL_i)\begin{bmatrix}\sin(\phi-\eta)-\\ \sin(\phi-\eta)\cos(3K_oL_o)+\\ 3\cos(\phi-\eta)\sin(3K_oL_o)\end{bmatrix}\end{array}\right\}. \tag{117}$$

We now have three expressions for the power from each of the three output legs of the [3×3] coupler at the output of the interferometer. These very complicated expressions are given in Eqns (109), (112), and (117). We can apply the conditions derived earlier for couplers which provide even splitting of the power to find several of the sines and cosines in these expressions. First we use Eqn (54).

$$\cos(2K_iL_i) = \cos\left[2\left(\frac{\pi}{4}+n\frac{\pi}{2}\right)\right] \tag{118}$$
$$= \cos\left[\frac{\pi}{2}+n\pi\right]$$
$$= 0$$

$$\sin(2K_iL_i) = \sin\left[2\left(\frac{\pi}{4}+n\frac{\pi}{2}\right)\right] \tag{119}$$
$$= \sin\left[\frac{\pi}{2}+n\pi\right]$$
$$= \pm 1$$

From Eqn (62)

$$\cos(3K_oL_o)=-\tfrac{1}{2} \tag{120}$$

From Eqn (64).

$$\sin(3K_iL_i) = \sin\left[3\left(\frac{\pi}{3}+\frac{\pi}{9}+n\frac{2\pi}{2}\right)\right] \tag{121}$$
$$= \sin\left[\pi\pm\frac{\pi}{3}+n2\pi\right]$$
$$= \pm\frac{\sqrt{3}}{2}$$

If we did not use couplers with evenly split power, or if we used couplers with imperfections that prevented even splitting from occurring, then these four trigonometric quantities would differ, but they still would be fixed numbers and so could be used to find equations describing the output of the interferometer.

We shall define two new angles $\xi_a$ and $\xi_b$ as $$\xi_a = \phi - \eta + \frac{\pi}{2} \tag{122}$$

-continued and $$\xi_b = \phi - \eta - \frac{\pi}{2}. \tag{123}$$

These two definitions amount to two different ways of specifying the origin of the phase, the point where the phase is zero. The reason for adopting these definitions should become clear presently. Substituting Eqns (119) and (120) into Eqn (109) for the case $\sin(2K_iL_i) = +1$ gives $$\begin{aligned}
\frac{|a_1(L)|^2}{2} &= \frac{A^2}{9}[1 - \sin(\phi - \eta)]\left[1 - \left(-\frac{1}{2}\right)\right] \\
&= \frac{A^2}{6}[1 - \sin(\phi - \eta)] \\
&= \frac{A^2}{6}\left[1 - \sin\left(\xi_a - \frac{\pi}{2}\right)\right] \\
&= \frac{A^2}{6}[1 + \cos(\xi_a)].
\end{aligned} \tag{124}$$

If $\sin(2K_iL_i) = -1$, then $$\begin{aligned}
\frac{|a_1(L)|^2}{2} &= \frac{A^2}{6}[1 + \sin(\phi - \eta)] \\
&= \frac{A^2}{6}\left[1 + \sin\left(\xi_b + \frac{\pi}{2}\right)\right] \\
&= \frac{A^2}{6}[1 + \cos(\xi_a)].
\end{aligned} \tag{125}$$

The definitions of $\xi_a$ and $\xi_b$ were rigged to make sure that the same equation results no matter what the sign of $\sin(2K_iL_i)$. This causes Eqns (124) and (125) to match Eqn (2.8a) in Crooker except that where she had a factor of 1/9, we have a factor of 1/6. [Crooker, "Two Demodulators for High Sensitivity Fiber Optic Interferometric Sensors," Naval Postgraduate School, Monterey, Calif. 1987] This represents the 1.76 dB advantage that results from using a [2×2] coupler at the input to the interferometer, rather than a [3×3] coupler.

We can go through the same process for outputs 2 and 3, also. In addition to the two possible signs of $\cos(2K_iL_i)$ that can occur, we must also account for the two possible signs of $\sin(3K_oL_o)$ which can occur, since this expression appears in Eqns (112) and (117). First we consider the case where $\sin(2K_iL_i) = +1$ and $$\sin(3k_oL_o) = \frac{\sqrt{3}}{2}.$$

For the power from output 2, we substitute Eqns (118) through (121) into Eqn (112).

$$\frac{|a_2(L)|^2}{2} = \frac{A^2}{36}\{6 + 2\sin(\phi - \eta) + \tag{126}$$

$$\begin{aligned}
\sin(\phi - \eta) &= 3\sqrt{3}\cos(\phi - \eta)\} \\
&= \frac{A^2}{6}\left\{1 + \frac{1}{2}\sin(\phi - \eta) - \frac{\sqrt{3}}{2}\cos(\phi - \eta)\right\} \\
&= \frac{A^2}{6}\left\{1 - \frac{1}{2}\cos(\xi_a) - \frac{\sqrt{3}}{2}\sin(\xi_a)\right\} \\
&= \frac{A^2}{6}\left\{1 + \cos\left(\xi_a + \frac{2}{3}\pi\right)\right\}.
\end{aligned}$$

For the power from output 3, we substitute (118) through (121) into Eqn (117).

$$\begin{aligned}
\frac{|a_3(L)|^2}{2} &= \frac{A^2}{36}\{7 - 1 + 3\sin(\phi - \eta) + 3\sqrt{3}\cos(\phi - \eta)\} \\
&= \frac{A^2}{36}\left\{1 + \frac{1}{2}\sin(\phi - \eta) + \frac{\sqrt{3}}{2}\cos(\phi - \eta)\right\} \\
&= \frac{A^2}{6}\left\{1 - \frac{1}{2}\cos(\xi_a) + \frac{\sqrt{3}}{2}\sin(\xi_a)\right\} \\
&= \frac{A^2}{6}\left\{1 + \cos\left(\xi_a - \frac{2}{3}\pi\right)\right\}.
\end{aligned} \tag{127}$$

Next we consider the change to Eqns (126) and (127) when $$\sin(3K_oL_o) = -\frac{\sqrt{3}}{2}.$$

$$\begin{aligned}
\frac{|a_2(L)|^2}{2} &= \frac{A^2}{6}\left\{1 - \frac{1}{2}\cos(\xi_a) + \frac{\sqrt{3}}{2}\sin(\xi_a)\right\} \\
&= \frac{A^2}{6}\left\{1 + \cos\left(\xi_a - \frac{2}{3}\pi\right)\right\}.
\end{aligned} \tag{128}$$

$$\begin{aligned}
\frac{|a_3(L)|^2}{2} &= \frac{A^2}{6}\left\{1 - \frac{1}{2}\cos(\xi_a) + \frac{\sqrt{3}}{2}\sin(\xi_a)\right\} \\
&= \frac{A^2}{6}\left\{1 + \cos\left(\xi_a + \frac{2}{3}\pi\right)\right\}.
\end{aligned} \tag{129}$$

By comparing these two equations with Eqns (126) and (127), we see that the effect of this change is equivalent to interchanging legs 2 and 3 in its effect on the outputs.

Next we consider the case where $\sin(2k_iL_i) = -1$ and $$\sin(3K_oL_o) = +\frac{\sqrt{3}}{2}.$$

For the power from output 2, we substitute Eqns (118) through (121) into Eqn (112).

$$\frac{|a_2(L)|^2}{2} = \frac{A^2}{36}\{6 - 2\sin(\phi - \eta) - \sin(\phi - \eta) - 3\sqrt{3}\cos(\phi - \eta)\} \quad (130)$$

$$= \frac{A^2}{6}\left\{1 - \frac{1}{2}\sin(\phi - \eta) - \frac{\sqrt{3}}{2}\cos(\phi - \eta)\right\}$$

$$= \frac{A^2}{6}\left\{1 - \frac{1}{2}\cos(\xi_b) + \frac{\sqrt{3}}{2}\sin(\xi_b)\right\}$$

$$= \frac{A^2}{6}\left\{1 + \cos\left(\xi_b - \frac{2}{3}\pi\right)\right\}$$

For the power from output 3, we substitute (118) through (121) into Eqn (117).

$$\frac{|a_2(L)|^2}{2} = \frac{A^2}{36}\{7 - 1 - 3\sin(\phi - \eta) + 3\sqrt{3}\cos(\phi - \eta)\} \quad (131)$$

$$= \frac{A^2}{6}\left\{1 - \frac{1}{2}\sin(\phi - \eta) + \frac{\sqrt{3}}{2}\cos(\phi - \eta)\right\}$$

$$= \frac{A^2}{6}\left\{1 - \frac{1}{2}\cos(\xi_b) - \frac{\sqrt{3}}{2}\sin(\xi_b)\right\}$$

$$= \frac{A^2}{6}\left\{1 + \cos\left(\xi_b + \frac{2}{3}\pi\right)\right\}$$

By comparing these two equations with Eqns (126) and (127), we see that the effect of this change is equivalent to interchanging legs 2 and 3 in its effect on the outputs. However, we had to redefine the phase origin (the point where phase is deemed to be zero). This should not disturb us, since the choice of origin is entirely arbitrary to begin with. A signal exhibiting periodic characteristics will take on every possible value of phase over time, so redefining the phase origin is akin to waiting a while before looking at a signal, and it does not affect the appearance of any of the signals.

By this time, it should be clear that the final condition, namely $$\sin(2K_iL_i) = -1 \text{ and } \sin(3K_oL_o) = -\frac{\sqrt{3}}{2} \quad (132)$$

will not change matters, but for completeness, we provide the equations anyway.

$$\frac{|a_2(L)|^2}{2} = \frac{A^2}{6}\left\{1 - \frac{1}{2}\cos(\xi_b) - \frac{\sqrt{3}}{2}\sin(\xi_b)\right\} \quad (133)$$

$$= \frac{A^2}{6}\left\{1 + \cos\left(\xi_b + \frac{2}{3}\pi\right)\right\}$$

$$\frac{|a_3(L)|^2}{2} = \frac{A^2}{6}\left\{1 - \frac{1}{2}\cos(\xi_b) - \frac{\sqrt{3}}{2}\sin(\xi_b)\right\} \quad (134)$$

$$= \frac{A^2}{6}\left\{1 + \cos\left(\xi_b + \frac{2}{3}\phi\right)\right\}$$

This exhaustive consideration of all possible conditions which meet the criteria for couplers with even split ratios shows that a reasonable model for the three outputs of the Mach-Zender optical fiber interferometer constructed with a [2×2] coupler at the input and a [3×3] coupler at the output can be given by the following equation. In this equation, the index k is an index to one of the three output legs. It can take on the values 1,2, or 3.

$$\frac{|a_k(L)|^2}{2} = \frac{A^2}{6}\left\{1 + \cos\left[\xi - (k - 1)\frac{2}{3}\pi\right]\right\}. \quad (135)$$

This equation represents the culmination of this tedious mathematics. Even so, this model is not quite right. That is, it does not describe the actual behavior of a real optical fiber interferometer sensor precisely. Wherein lie the differences?

First, this equation is based on the presumption that there are no losses in the couplers or fibers. Since there are losses in a real interferometer, the leading coefficient $$\frac{A^2}{2}$$

should be replaced by whatever amount of power does arrive at the output. We shall call this amount D. The units of D will vary, depending on the context. When we are speaking of optical power, D will be measured in watts. When the received optical power has been converted to a current by its action on a photodiode, D will be measured in amperes. When the current has been converted to a voltage through the action of a transimpedance amplifier, then D will be measured in volts. However, the form of the modified model we are developing here will not be altered.

A second reason for the inaccuracy of the model considered here is our failure to include a consideration of the polarization of the recombined light in our equations. We have assumed that the two combining beams can be fully parallel or fully anti-parallel, which implies that they both have the same amplitudes. (If the polarizations are antiparallel, an additional phase shift of $\pi$ radians occurs.) In practice, due to different degrees of attenuation in each leg of the interferometer, imperfections in the couplers, and rotation of the polarization of each beam, this will not be the case. The result of this is that the intensity of the interferometric output will not wander through the full range from 0 to D, but from somewhat above 0 to somewhat less than D. Put another way, the coefficient of the cosine in the above equation needs to be reduced from 1 to some lesser value. We shall define a new quantity, E, measured in the same units as D. This new quantity is defined implicitly by the following modified model.

$$\frac{|a_k(L)|^2}{2} = D\left\{1 + \frac{E}{D}\cos\left[\xi - (K-1)\frac{2}{3}\pi\right]\right\}. \quad (136)$$

We call the fraction E/D the fringe depth. Multiplying this out gives $$\frac{|a_k(L)|^2}{2} = D + E\cos\left[\xi - (k-1)\frac{2}{3}\pi\right]. \quad (137)$$

The three signals represented by this equation vary around a central value, D, by ±E, at most. Whether or not they actually reach the two extrema at D+E and D-E depends on the signal $\xi$. If it has a very small amplitude, then the cosine will not vary much and so the extreme values will not, in general, be achieved. On the other hand, if $\xi$ has a very large amplitude, more than ±$\pi$ radians, in particular, then the signals are guaranteed to reach both extrema.

It is worth discussing the units of $\xi$ at this point. As we tacitly assumed in the previous paragraph, $\xi$ is measured in radians. It represents the amount of optical phase shift due to strain on the glass in the optical fiber interferometer. So the signal of interest, no matter what its natural units, produces differential stretching of the two legs of the interferometer. The number of wavelengths of differential stretching corresponds to the number of multiples of $2\pi$ radians of phase shift induced in the interferometric output.

In the equation as written, there are only two contributions to the phase shift. One is the signal of interest. The other is the choice of an output leg. However, as the earlier lengthy discussion of shifting the phase origin made plain, we are free to choose any origin we like, and only the difference in phase between the output of one leg and another is of importance.

There are other contributors to the phase. For example, changes in temperature and pressure may stretch the glass or permit it to relax, even if they are not the phenomena we want our sensor to detect. These additional factors usually vary slowly with time, although this is not necessarily so. If we lump them together into a single term $\phi(t)$, then we can write the equation which describes our complete model.

$$\frac{|a_k(L)|^2}{2} = D + E\cos\left[\xi(t) + \phi(t) - (k-1)\frac{2}{3}\pi\right]. \quad (138)$$

This use of the symbol $\phi$ is not to be confused with its earlier use to describe the shift in phase of the light in one of the two legs of the interferometer (the other was $\eta$).

One final observation about this model is in order. It is assumed that D and E are equal for any choice of output leg (1, 2, or 3). In practice, each output leg has its own value of D and E. Having noted this fact, we shall continue to use the approximation that they all are equal because of the simplicity this assumption entails, and the fact that it is a fairly good approximation.

Up to the time when we built this optical interferometer, we had been constrained to using simulations of interferometric outputs. One simulation was provided by a set of three Analog Interferometric Simulators. These were limited in the amount of peak phase shift they could deliver to around 2 rad, although the Analog Devices AD639 on which they depend permit ±500°. Exceeding about 2 rad led to increasingly apparent distortion in the waveforms delivered by the simulators.

A second simulation was provided by a Digital Quadrature Phase Shift Modulation Simulator. This simulation could easily achieve phase shifts of several hundreds of radians. Unfortunately, it was only able to produce square waves at its output. Thus the outputs were not very good replicas of the output of an optical interferometer, which can generate a continuous range of output amplitudes, not just two of them.

One of the chief purposes of building optical fiber interferometric sensors is to avoid the need to have electrical signals in inaccessible locations. Eliminating the need for electrical signals permits reductions in weight, cost, and susceptibility to electromagnetic interference (EMI). The sensor we have built for experimental purposes is a voltage sensor. Clearly there is no avoidance of the presence of electrical signals in a sensor which detects electrical signals!. However, the benefit of great sensitivity is still present in our sensor: very small changes in the size of the piezoelectric cylinders create a noticeable optical phase shift in the sensor's interferometric output, so quite small voltages can be detected. When we discuss the performance of the Symmetric Analog Demodulator, for example, we shall see that it can detect voltages of 2.2 $\mu V$ in a 1 Hz bandwidth and has a dynamic range of 115 dB (in the same bandwidth) at a frequency of 600 Hz. The most attractive feature of our sensor is its ease of operation. Voltage sources are easily controlled, so we can generate optical phase shift of controllable amounts with this sensor. It is an excellent tool for the kind of research we conducted into demodulation.

The interferometer according to the inventor was physically laid out as shown in the diagram in FIG. 8. A single voltage signal is applied in opposite polarities to each to two Channel 5500 piezoelectric cylinders 30,32. This causes one cylinder 30 to expand while the other 32 contracts, and vice versa. The fibers are wrapped around each cylinder with constant tension. There are 9.099 m of 125 $\mu m$ single-mode optical fiber in each leg, as measured from the [2×2] coupler's (34) output to the [3×3] coupler's (36) input. The actual length is not critical, so long as the two lengths are within a few centimeters of being the same. As one cylinder expands, it applies a strain to its fiber. At the same time, the other cylinder is contracting and its fiber is relaxing. The first fiber experiences an increase in its optical path length; the other fiber experiences a reduction in the optical path length.

FIG. 9 shows the details of how the cylinder was clamped onto the mounting brackets in such a way that it could still respond to the applied voltage without undue mechanical interference from the mounting hardware. The piezoelectric cylinder 30 is spaced from an aluminum baseplate 38 with a rubber washer 40. An acrylic spacer 42, rubber washer 44, and metal washer 46 are stacked in turn above the piezoelectric cylinder 30. The stack thus formed is bolted through the center to the baseplate 38.

To apply a constant tension to the fibers wrapped on each cylinder, we used the apparatus shown in FIG. 10. A table 50 holds a spindle (not shown) on which the piezoelectric cylinder 30 is turned. A second spindle 52 with a pulley 54 supports the fiber which in turn is passed under a weighted pulley 56 and attached to the table with adhesive. For our purposes, the amount of tension was not significant. Our desire was simply to ensure that the tension was a constant so that uniform expansion and contraction of the cylinders would produce uniform increases and decreases in the strain on the optical fiber wrapped around them.

The [2×2] optical fiber coupler we used was an Amphenol Model 945-122-1002. It is specified for a wavelength of 820 nm, although we operated it at 830 nm. As we said, the split ratio of the coupler is equal in both legs (measured by the manufacturer as 47%–53%), and the coupler is bidirectional. The excess loss is specified at below 1.0 dB (measured by the manufacturer as 0.59 dB)

The [3×3] coupler is a Sifam Model Special 33S 82C. It is specified for a wavelength of 830 nm. It also has equal splits in all three legs, if only one leg is used for input. Of course, in an interferometer this condition is not met, and so each output is different. We made our measurements of split ratios by applying a known current to the laser diode, a Sharp LT-015 whose wavelength in a vacuum is 830 nm laser (560 nm in glass). This laser was repackaged by Seastar as a Model PT-450. To measure the power from each leg, we fused the laser diode to each input leg in turn. For each input, we successively placed a different output leg into a slotted cylinder which we then inserted into a UDT Model 255 Photodiode with a barrel receptacle. A BNC connector on one end of the Photodiode was then mounted directly into the mating BNC connector on a UDT Model 550 Fiber Optics Power Meter. We did not calibrate the meter for operation at 830 nm. Since we were only interested in measuring the relative transmissivity of each leg, this omission is not a flaw in our technique. The chief elements of variability in this technique are:
1. The transmission of the fusion splice in each case is different, but since the total power is measured for each splice, this is not significant:
2. The insertion of an output into the slotted cylinder and its placement in the detector barrel is imprecise, but the UDT Model 550 is a large-area detector and hence does not require precise alignment.

The [2×2] coupler had about 10 m of fiber attached on two leads; the other two leads had only about a meter of fiber attached. The [3×3] coupler had only about 1 m of fiber on each end of its three legs. We recommend obtaining them with as much fiber already attached to them as will be needed in the sensor where they will be used. This will permit the number of fusion splices to be reduced. Since each splice raises the possibility of more reflections, more transmissive loss, and more of a nuisance generally, this is a very useful reduction.

We used a Sumitomo Type 11X Fusion Splicer to splice our fibers together. It provides a microscope for precise positioning of the bared fiber prior to fusion by electric arc. This particular splicer does not permit a very large range of adjustment in the position of the fibers laterally and vertically, so if placement is not quite good in advance, it is very difficult to get it right without starting over again. As a consequence, splicing can consume a large amount of time (and did so).

A good way to check on the success of a splice is to shine light (we used laser light) through it before the fusion occurs. The far end of the receiving fiber can be connected to a photodetector and thence to either a power meter or an oscilloscope. By adjusting the position of both ends of the fiber to be fused, we can maximize the received power. We found that alternating between adjusting lateral position and vertical position enabled us to find the optimum position fairly quickly, if the optimum position could be reached at all by the adjustment controls on the fusion splicer. After fusion occurs, there should be more power received than before the fusion (by 0.5 to 1.0 dB). If this is not the case, then the fusion splice was poor. The fiber should be broken, the buffer should be stripped again, the ends should be cleaved once more, and the fusion splice should be repeated.

To make Mach-Zender interferometer with legs properly matched in length requires considerable care. Suppose enough fiber has been attached to the input coupler to form the two legs of the interferometer. One of the two legs can be spliced to an input leg of the output coupler without too much trouble if we monitor the power transmitted through the leg both before and after splicing it to the output coupler. The connection of the remaining leg to the output coupler is considerably more difficult. Light passing through it also passes through the already-completed leg, since they are effectively connected together at the input coupler. When we bring the remaining leg close to the output coupler in order to splice it to the coupler, two coherent beams recombine, producing interference. No longer is there a constant power level from the coupler. This complicates the task of finding the optimal position of the remaining fiber prior to completing the second fusion splice. However, one can still search for the placement of the fibers which generates the maximal fringe depth.

A bigger problem occurs if the second fusion splice fails. In this case, the second leg will be shorter than the first. It generally is necessary to break the first leg again in order to ensure the lengths are equal (or nearly so). We recommend acquiring some practice and skill in performing fusion splices before tackling this tedious task.

Upon the completion of the construction of our interferometer, we placed the three output fibers of the terminating [3×3] optical fiber coupler into three slotted cylinders. Each of these was in turn inserted into a mounting barrel with a photodiode within it. We had two CLD42163 photodiodes and one CLD41461 photodiode available, and so we used them. Without calibrating the UDT Model 550 Fiber Optics Power Meter for operation at 830 nm, we measured the responsivity of these photodiodes as 370 ma/W for the two identical photodiodes and 362 ma/W for the odd one. Since we did not perform a calibration, these results are not likely to be accurate, but accuracy here was not crucial to our development of the demodulators. Our purpose was to develop an understanding of the factors which affected performance, not to optimize the performance. For fine tuning of the performance, however, the responsivity of the photodiodes is an important parameter of operation because it determines the amount of current delivered to the receiver stage.

Our interferometer produces a very highly linear optical phase shift for an applied voltage. We used an HP6824A DC Power Amplifier to boost the output of an HP3314A Function Generator from an amplitude of 10 V maximum to an amplitude of 60 V maximum. For convenience, we adjusted the gain of the power amplifier to approximately 10. This amplified signal was then applied in opposite polarities to each of the piezoelectric cylinders in the interferometer.

The elliptical Lissajous figure on an oscilloscope which results from two of these outputs closes on itself, retracing the same elliptical pattern, if an optical phase shift amplitude in excess of $\pi$ radians is generated by the interferometer; otherwise it is open. We found that after closure had occurred, it was easy to see the ends of the traces and so count the number of closures as the applied voltage was increased. We noted the voltage for each such closure, which represented an additional $\pi$ radians of optical phase shift.

If we apply a linear least-squares fit to these data, we find the relationship between nominal voltage displayed on the front panel of the HP3314A and the optical phase shift delivered by the interferometric sensor is given by the following equation:

$$A_{OUT} = \left(34.29 \pm 0.02 \tfrac{rad}{V}\right) V_{IN} + (-0.64 \pm 0.08 \text{ mrad}). \quad (139)$$

We shall make extensive use of this highly linear relationship later in order to infer the output optical phase shift from a selected nominal input voltage.

The method of fringe-rate demodulation was discussed at some length in Crooker and Crooker et al. [Crooker et al, "Fringe Rate Demodulator for Fiber Optic Interferometric Sensors", SPIE Vol. 838, *Fiber Optics and Laser Sensors V* (1987), pp. 329-331] The fundamental idea is to take two of the outputs of an optical fiber interferometric sensor terminated by a [3×3] optical fiber coupler, convert them to two square waves, and measure the frequency of the modulation of the optical wave with a frequency-to-voltage converter. By integrating this result over time, we can recover the signal. An ambiguity results from the use of this scheme. A limitation inherent to the technique is that phase amplitudes of less than one half fringe ($\pm \pi$ rad) cannot be recovered successfully.

When the signal of interest is strong, it induces a large peak phase shift in the light. At the moment that the signal peaks, however, the instantaneous frequency of the output is zero. Conversely, when the signal is zero, the output is changing most rapidly. This corresponds to a large instantaneous peak frequency of the interferometric output.

To see this, the mathematical form of the interferometric output x(t) for a single input tone of frequency f. That is if $\xi(t)$ represents a signal of interest $$\xi(t) = A \sin(\omega t) + A \sin(2\pi f t), \quad (140)$$

then we may use Eqn (5) to obtain $$x(t) = D + E \cos[A \sin(2\pi f t) + \phi]. \quad (141)$$

In this expression, the phase $\phi$ includes the phase terms due to choosing a particular output of the interferometer as well as all the extraneous influences on phase mentioned previously. Recall that D is the central value around which the output waveform varies, E is the peak departure of the interferometric output from D, A is the phase amplitude of the input, f is the frequency of the signal of interest, and t is the time. The instantaneous frequency of the output in hertz is defined as the derivative of the argument of the cosine function with respect to time, divided by $2\pi$.

$$f_{INSTANTANEOUS} = \frac{1}{2\pi} \frac{D\xi(t)}{2\pi} = Af\cos(2\pi f t). \quad (142)$$

Here, we assume that the derivative of the phase term $\phi$ is small and can be neglected. Whenever the extraneous contributions to the phase shift are of a quasi-static nature, this is a reasonable assumption. The instantaneous frequency is maximal when the cosine in the derivative given by Eqn (142) reaches a peak, that is, when $$2\pi f t = n\pi \quad (143)$$

where n is an integer. This occurs when the sine in the interferometric output of Eqn (141) is zero, since $$\sin(n\pi) = 0, \quad (144)$$

that is, when the signal of interest passes through zero.

If we can convert the instantaneous frequency to a voltage, then we need only integrate it over time to recover the signal $\xi(t)$, in effect, reversing Eqn (142). The chief difficulty in this scheme is not the conversion of frequency to voltage, since integrated circuits to perform this function are readily available. Rather, it is the fact that a high instantaneous frequency occurs both when $\xi(t)$ is rising and when it is falling. Yet frequency-to-voltage converters do not give different outputs for these two situations.

We would like our converter to give, say, a rising output when the instantaneous frequency is high and when $\xi(t)$ is rising. With this choice, we would also like it to give a falling output when $\xi(t)$ is falling. Succinctly, we need to distinguish between two distinct situations, both of which give rise to high voltages from a frequency-to-voltage converter. If the voltage from the frequency-to-voltage converter can range from 0 V to, say, $V_{MAX}$, then we would like to invert this range on alternate cycles to 0 V to $-V_{MAX}$. Crooker's method calls for the use of an optional inverter to do this range on alternate cycles to to do this.

The use of a [3×3] coupler at the interferometer's output provides enough information to make it possible to distinguish between a high instantaneous frequency due to a rising signal of interest and a high instantaneous frequency due to a falling signal of interest. In its simplest form, the method uses two of the three available outputs and determines which one leads and which one lags the other. From Eqn (5), the [3×3] coupler generates three outputs of the form $$x_k(t) = D + E\cos\left[\xi(t) - (K - 1)\tfrac{2}{3}\pi\right] \quad (145)$$

where $\xi(t)$ is the signal of interest and k is a index which can be 1,2, or 3. Here, we are ignoring the additional phase shifts due to extraneous influences such as pressure and temperature.

FIG. 11 is a block diagram of a Fringe Rate Demodulator. Without any loss of generality, we can arbitrarily select two of the three outputs of the interferometer, say $x_1(t)$ and $x_2(t)$, as two channels of input to the Fringe Rate Demodulator. With this choice, Eqn (145) implies that when $\xi(t)$ is increasing, $x_1(t)$ leads $x_2(t)$ by 120°. But when $\xi(t)$ is decreasing, $x_2(t)$ leads $x_1(t)$ by 120°. A comparable situation obtains no matter which pair of outputs we select.

We shall put both of these signals through comparators 60, 62 so that the result is either a logical 0 (0 volts) or a logical 1 (5 volts). One of these logical signals we now label I (for in-phase) and the other Q (for quadrature). This terminology is somewhat anachronistic, since the term "quadrature" generally refers to 90°, not 120°. Crooker discovered that fringe-rate demodulation is largely insensitive to this fairly large difference in phase angles. So although the fringe-rate method originally was conceived of as operating when a 90° phase difference were present, phase differences of 120° work perfectly adequately.

We now develop the Boolean logic which permits the determination of whether I leads Q, or vice versa. The resultant logic is different from that given in Crooker and Crooker et al. Our purpose in altering her equations is to facilitate the programming of a programmable logic array (PLA) to contain all the logic, rather than using discrete logic integrated circuits. We made use of an Altera EP310 Erasable Programmable Logic Device (EPLD) 64, a form of PLA which can be erased under ultraviolet light and reprogrammed. This characteristic is useful in the design of prototype systems.

We also modified Crooker's approach from one using synchronous, clocked logic to one using asynchronous logic. This permitted more rapid transitions of the outputs to new states, which reduces the lag in recognizing that the signal which was leading before is now lagging, and vice versa.

We assume that I and Q cannot both make a transition simultaneously. That this is true is implied by Eqn (145), for there is no angle $\phi$ such that $$\cos(\phi) = \cos(\phi + \tfrac{2}{3}\pi) = 0. \tag{146}$$

The goal of the circuit is to produce a lead-lag decision signal LL which will take on the value 1 when I leads Q and the value 0 otherwise. The PLA will store the most recently computed value of LL in an internal flip-flop, present it as an output to the circuit, and use it to determine the next value of LL.

In addition to computing LL, the circuit must store the most recent values of I and Q internally, since these have a bearing on the determination of the next value of LL. These values we shall call $I_{OLD}$ and $Q_{OLD}$. Like LL, they will be stored in flip-flops internal to the PLA. The EP310 64 requires that all computed values be presented as outputs to the circuit, so LL, $I_{OLD}$, and $Q_{OLD}$ will be available as outputs. Of course, we want LL as an output in any case so that it can provide the lead-lag decision to the optional inverter. The frequency output from the EPLD is passed to a frequency to voltage convertor 66. The voltage from the frequency to voltage convertor is fed to an optional inverter 68 together with the lead(H)/lag(I) signal to produce the derivative of the signal of interest. This derivative is fed to an integrator 70 to produce the signal of interest.

If we were using synchronous logic, LL, $I_{OLD}$ and $Q_{OLD}$ would only change when the clock signal permitted them to do so. Because we are using asynchronous logic, however, this is not the case. Instead, they swiftly take on new values in response to changes in the inputs. For the brief interval during which the old and new values differ, transistions must be taking place. Therefore we must take care that transitions in the outputs never give wrong results, even momentarily. In this case, there are two desired outputs. One is the signal LL (for lead-lag) which will be 1 if I leads Q and which will be 0 is Q leads I. The second output is a pulse train whose state changes whenever I or Q changes state. This pulse train provides the frequency input to a frequency-to-voltage converter. Since one cycle of I corresponds to the passing of one fringe ($2\pi$ radians), and likewise for Q, we can generate two cycles of output for each fringe in this manner. This has the advantage of permitting slightly smaller phase shifts to be resolved by the fringe-rate demodulator. Theoretically, one can accept an interferometric output with as little as $\pm \pi/2$ radians of phase shift with this method. If the third output of the interferometer were incorporated in the logic, a more rapid pulse train could be generated, and this would lead to a minimum resolution of $\pm \pi/3$ radians of phase shift. In practice, these minima are not sufficient: one needs a number of fringes before reasonable fidelity in the reconstructed wave can be achieved.

FIG. 12 contains a Karnaugh map of the digital logic necessary to generate LL. $I_{OLD}$ is the value of the in-phase channel which was observed most recently. $Q_{OLD}$ is the value of the quadrature channel which was observed most recently. I is the current (incoming) value of the in-phase channel. Q is the current (incoming) value of the quadrature channel. $LL_{OLD}$ is the last computed value of the lead-lag signal, which the circuit generated. The new value of the lead-lag signal, LL, is determined by looking up in the Karnaugh map that value which corresponds to the five inputs: $LL_{OLD}$, $I_{OLD}$, $Q_{OLD}$, I, and Q.

For example, suppose that the circuit's most recent output for LL was O, which means that at the time when LL last was determined, the in-phase channel was lagging the quadrature channel. If it so happened that $I_{OLD}=0$ and $Q_{OLD}=1$, then, since the in-phase channel was lagging before, we expect it to follow the quadrature channel to I very soon. If this happens, then I=1 and Q-1 after the transistion occurs. This implies that the in-phase channel still lags the quadrature channel, so the new output LL should remain 0. But suppose, instead, that Q reverts to 0 without I ever having gone to 1. This means that the quadrature channel is now lagging the in-phase channel. Since the new values of the channels are I=0 and Q=0, the Karnaugh map shows that the next value of LL should be 1.

All other entries in the Karnaugh map were filled out in a similar manner. The symbol X shows transitions which we do not expect ever to occur The underlying supposition is that the in-phase and quadrature channels cannot both change at the same time, an assumption we have already discussed. The four logical equations of the EPLD are as follows.

$$LL = (I \wedge \overline{I_{OLD}} \wedge \overline{Q}) \vee (I \wedge LL \wedge \overline{Q_{OLD}})$$
$$\vee (I \wedge Q \wedge \overline{Q_{OLD}}) \vee (\overline{I} \wedge LL \wedge Q_{OLD})$$
$$\vee (\overline{I} \wedge I_{OLD} \wedge Q) \wedge (I_{OLD} \wedge LL \wedge Q)$$
$$\vee (\overline{I} \wedge I_{OLD} \wedge LL \wedge \overline{Q}) \vee (\overline{I} \wedge \overline{Q} \wedge Q_{OLD}),$$

(147)

$$f_{OUT} = I \oplus Q. \quad (148)$$

$$I_{OLD} = I, \quad (149)$$

and $$Q_{OLD} = Q. \quad (150)$$

The symbol ∧ means logical AND; the symbol ∨ means logical OR; and the symbol ⊕ means logical EXCLUSIVE-OR.

We shall defer until later the specifics of the design of a receiver to convert the interferometric outputs into voltage signals. For the time being, suffice it to say that these signals will be in the form of Eqn (145), and that the units of D and E will be volts. The receiver will deliver signals in the range D±E, with D=0 V and E=10 V.

FIG. 13 is a schematic of a comparator which we use to convert this bipolar signal to a unipolar (binary) signal. The LF311 comparator is made by National Semiconductor. [National Semiconductor Corporation, Special Purpose Linear Devices, Santa Clara, Calif., 1989, hereinafter SPLD] The data book uses the symbol for the open-collector output shown in FIG. 13. The design equations derived there are given hereafter. Provided that the conditions $$V_s^- = -V_s^+, \quad (151)$$

$$R_1 < R_3, \quad (152)$$

$$R_2 < R_3, \quad (153)$$

and $$R_4 < R_3. \quad (154)$$

are met, then the lower switching threshold of the comparator is given by $$V_{THRESHOLD} = \frac{R_2 - R_1}{R_1 + R_2} V_s^+ \quad (155)$$

and the upper threshold is higher than this be $$V_{INCREMENTAL} = \frac{R_1 \| R_2}{R_3} V_H. \quad (156)$$

How much hysteresis we want is dependent on the amount of noise we expect to see. For our purposes, we chose to set $V_{THRESHOLD} = -50$ mV and $V_{INCREMENTAL} = +100$ Mv. This means that switching of the output from high to low will only take place when the input goes below $-50$ Mv, and switching from low to high will only take place when the input goes above $+50$ Mv. We picked $R_4 = 1.00$ kΩ. Suppose that $R_2 = \alpha R_1$ for some number $\alpha$. Then from Eqn (155) we have $$\frac{(\alpha - 1)R_1}{(\alpha + 1)R_1} V_s^+ = \frac{\alpha - 1}{\alpha + 1} = -50 \text{ mV}. \quad (157)$$

We shall select $V_s^+ = +15$ V. Solving for $\alpha$ we find $$(\alpha - 1)(15V) = -(\alpha + 1)50\text{mV} \quad (158)$$
$$\alpha(15V + 50\text{mV}) = 15V - 50\text{mV}$$

$$\alpha = \frac{14.95}{15.05} = 0.993.$$

If we choose $R_1 = 10.0$ kΩ $+ 66.5$ Ω (a series combination) and $R_2 = 10.0$ kΩ then we find $V_{THRESHOLD} = -49.7$ mV, which is reasonably close to the desired value, 50 mV.

Next we can apply Eqn (156) to the desired amount of hysteresis, which is the difference between the upper and lower threshold levels, or 100 mV. The value of $V_H$ is $+5$ V in our digital logic circuitry. So $$\frac{R_1 \| R_2}{R_3} V_H = 100 \text{ mV} \quad (159)$$

$$R_3 = \frac{R_1 \| R_2}{100 \text{ mV}} (5 \text{ V}) \quad (160)$$
$$= \frac{5.017 \text{ k}\Omega}{100 \text{ mV}} (5 \text{ V})$$
$$= 251 \text{ k}\Omega.$$

As it happens, standard 1% resistors do not come in values of 251 kΩ; the nearest value is 249 kΩ for $R_3$. Using the chosen resistor values, we except to see lower and upper switch threshold levels of $-48.7$ mV and 49.6 mV, both of which are close enough to the desired values. To get smaller values would be difficult with 1% resistors without carefully choosing them for accuracy. Note that the 66.5 Ω resistor (which, with 10.0 kΩ, makes up $R_1$) is less than 1% of the 10.0 kΩ resistor as it is. This means that a resistor which has a nominal resistance of 10.0 kΩ might actually have as little as 9.9 kΩ and as much as 10.1 kΩ. Adding 66.5 Ω to this does not guarantee that we get 10.0665 Ω. In the laboratory, we did not need to pick the 10.0 kΩ specially, as it happened, but it could easily have been necessary. This is an unattractive feature of the design of this comparator which really arises because we want such a small level of hysteresis. If we relaxed this need, the inaccuracies of 1% components would cease to be a constraint.

Two of these comparators are used, one for each of the two interferometric outputs we choose to use in the Fringe Rate Demodulator. In FIG. 15 we show the schematic of the rest of the Fringe Rate Demodulator. The unipolar outputs of the two comparators become the inputs to the I and Q inputs of the EP310 Erasable Programmable Logic Device (EPLD) described earlier.

The LL output of the EP310 causes the LF13333 Quad SPST JFET Analog Switch to alternate between connecting its D4 input at pin 15 to the ground at the pin 14 and leaving D4 open. When D4 is grounded, the non-inverting input to the optional inverter built around the LF356 Monolithic JFET-Input Operational Amplifier is grounded. This causes the LF356 to function as an inverting amplifier of gain 1. When D4 is left open, the voltage at the input to the LF356 is the same as that from the output of the LM2917N Frequency-to-Voltage Converter. Because an operational amplifier with negative feedback tries to keep both its inputs at the same voltage level, there will be no current flowing through the feedback network, and so the output will not be inverted when D4 is left open.

The EP310 generates a frequency signal at its pin 16 which serves as the input to the LM2917N, which is often loosely referred to as a tachometer chip. This signal is formed from the exclusive-or of its two inputs, so the output frequency is roughly twice that of the input frequency. We cannot say it is precisely double, since the instantaneous frequency of a phase-modulated signal is not a constant. The voltage level provided to pin 11 of the LM2917N by a resistive divider comprising resistors $R_1$ and $R_2$ is around 2 V.

Our design differs in another respect from that in Crooker. She used a high-pass filter at the input to the frequency-to-voltage converter and a comparator threshold of zero. We used no filter, just a threshold about midway between the upper and lower voltage levels generated by the EP310. An advantage to avoiding the use of the filter is that, potentially, the absence of a capacitor could provide the ability to handle higher frequencies. Since the frequency input can be either 0 V or 5 V, the input comparator of the LM2917N will not change unless the frequency input changes. Because this signal is derived from the interferometric outputs, its frequency is high when the phase in the interferometer is shifting most rapidly, and it is low when the phase shift reaches an extreme.

From the data sheet for the LM2917 [SPLD], an equation describing the output voltage of the frequency-to-voltage converter is $$V_{OUT} = V_{cc} f_{IN} C_1 R_3 K. \quad (161)$$

$R_3$ and $C_1$ are the external components attached to the charge pump within the converter. $V_{cc}$ is 15 V, the voltage supplied to the output transistor within the converter. K is the gain of the converter; it is roughly 1. The zener diode in the LM2917N limits the voltage from the operational amplifier which controls the transistor at its output to 7.56 V at most. We could include some gain in its feedback loop, but it is just as easy to apply the gain in the following stage, which is what we chose to do. We would like $V_{OUT}$ to reach this maximum when the maximum input frequency occurs. What is this frequency?

For a signal of interest of the form $$\xi(t) = A \sin(2\pi f t). \quad (162)$$

recall that the interferometric output is of the form $$x(t) = D + E \cos[A \sin(2\pi f t)]. \quad (163)$$

We shall design the circuit to handle the case where A=100 rad and f=200 Hz. The peak instantaneous frequency in the interferometric output is roughly equal to the number of compete cycles in interferometric output in one second. In a quarter of a period of the signal of interest, T/4, there are $A/2\pi$ cycles of the interferometric output. So the frequency is roughly $$\frac{\left(\frac{A}{2\pi}\right)}{\left(\frac{T}{4}\right)} = \frac{2A}{\pi T} = \frac{2Af}{\pi}. \quad (164)$$

However, the EP310 has logic which roughly doubles the frequency delivered to the LM2917N, so the actual frequency is therefore estimated as $$f_{IN} = \frac{4Af}{\pi}. \quad (165)$$

Therefore we expect the EP310 to see a peak frequency of $$f_{IN} = \frac{4(100 \text{ rad})(200 \text{ Hz})}{\pi} = 25.5 \text{ kHz.} \quad (166)$$

Now from the specifications for the LM2917N [SPLD], a restriction on the input frequency is $$f_{IN} \leq \frac{I_1}{C_1 V_{cc}}. \quad (167)$$

In this expression, $I_1$ is the current delivered to the timing capacitor $C_1$, $f_{IN}$ is the frequency delivered to the input of the LM2917N, and $V_{cc}$ is the supply voltage. We can use this expression to determine the value of $C_1$ because $I_1$ is specified in the databook. We have chosen $V_{cc}=15$ V, and we have just found that $f_{IN} \approx 25.5$ Khz at most.

$$C_1 = \frac{I_1}{f_{IN} V_{cc}} = \begin{cases} \frac{140 \ \mu A}{(25.5 \text{ kHz})(15 \text{ V})} = 367 \text{ pF for the minimum } I_1 = 140 \ \mu A \\ \frac{240 \ \mu A}{(25.5 \text{ kHz})(15 \text{ V})} = 630 \text{ pF for the maximum } I_1 = 240 \ \mu A \end{cases} \quad (168)$$

Unfortunately, the databook recommends keeping $C_1 > 500$ pF for accuracy. Whether or not we can handle the maximum frequency for this choice of $C_1$ depends on the current $I_1$, and this is dependent on the characteristics of the particular device we end up using. We can calculate the peak frequency we can handle, however. We have $$f_{IN} \leq \frac{I_1}{C_1 V_{cc}} = \quad (169)$$

$$\begin{cases} \frac{140 \ \mu A}{(500 \text{ pF})(15 \text{ V})} = 18.7 \text{ kHz if } I_1 = 140 \ \mu A \\ \frac{240 \ \mu A}{(500 \text{ pF})(15 \text{ V})} = 32.0 \text{ kHz If } I_1 = 240 \ \mu A \end{cases}$$

In the worst case, $I_1 = 140 \ \mu A$ and $f_{IN} \leq 18.7$ Khz. If f=200 Hz, then we must have $$A \leq \frac{f_{IN} \pi}{4f} = \frac{(18.7 \text{ kHz})\pi}{4(200 \text{ Hz})} = 73.3 \text{ rad.} \quad (170)$$

If we lower $C_1$ slightly to 470 Pf, we can raise this to 78.0 rad. Although the accuracy of the output will suffer a little, we only need one capacitor to achieve this value, whereas it would take two to obtain 500 Pf. The elimination of one component with a consequent increase in the permissible phase amplitude A is a satisfactory compensation for the sacrifice in accuracy.

By using the optional inverter, we create a bipolar output which is negative when I lags Q and positive otherwise. However, this signal is proportional to the derivative $\dot{\xi}(t)$ of the signal of interest, $\xi(t)$ in Eqn (140). We must integrate this to recover $\xi(t)$ itself.

The LF444 Quad Low Power JFET Input Operational Amplifier performs the integration function. The output of our integrator circuit can be shown to be $$G(f) = \frac{V_{OUT}}{V_{IN}} = -\frac{1}{R_1 C_2} \frac{1}{j2\pi f} \qquad (171)$$

provided that the input frequency f is much greater than the pole frequency $f_p$. There are actually two poles in this circuit. A design goal is to set them equal to each other. We can show that $$f_p = f_1 = \frac{1}{2\pi R_1 C_1} = f_2 = \frac{1}{2\pi R_2 C_2}. \qquad (172)$$

We want to choose $f_p$ so that the error in the phase is small in the frequency range of interest to us. We would like to have reasonable accuracy in both phase and gain when f>20 Hz (a design choice). The error can be shown to be $$\epsilon_p = -2\tan\left(\frac{f}{f_p}\right). \qquad (173)$$

If we choose $f_p=0.5$ Hz, then this error will be only 3° for f=20 Hz; it will fall to 0.3° for f=200 Hz. The error $\epsilon_M$ in the gain can be shown to be $$\epsilon_M = -\frac{1}{1 + \left(\frac{f}{f_p}\right)^2}. \qquad (174)$$

So for this same choice of $f_p$ the error in magnitude will be less than 0.06%, and it will be even less significant at higher frequencies, Our choice of $f_p=0.5$ Hz determines the two products $R_1C_1$ and $R_2C_2$.

$$R_1 C_1 = R_2 C_2 = \frac{1}{2\pi f_p} = 318 \text{ ms}. \qquad (175)$$

We also have to select the desired gain factor, $1/R_1C_2$. For an input to the interferometer of $\pm 100$ rad at f=200 Hz the output of the frequency-to-voltage converter is measured as 3.8 V. To get an amplitude of 7.56 V out of the integrator under these conditions the gain must be 7.56 V/3.8 V, or 2.0. So.

$$\frac{1}{R_1 C_2} \frac{1}{2\pi f} = 2.0 \qquad (176)$$

$$R_1 C_2 = \frac{1}{2\pi (200 \text{ Hz})(2.0)} = 398 \text{ }\mu s.$$

In the end, we increased the gain to about 3 by lowering $R_1C_2$ to around 265 $\mu$s.

By trial and error, we find combinations of $R_1$, $R_2$, $C_1$, and $C_2$ which meet these conditions and which are available or are easily produced from available components. A viable solution is $$R_1 = 392 \text{ k}\Omega, \quad R_2 = 475 \text{ M}\Omega, \qquad (177)$$
$$C_1 = 800 \text{ nF}, \quad C_2 = 680 \text{ pF}.$$

The above discussion explains how the component values in the integrator were chosen. To get the large resistance $R_2$ in the feedback network, we used a Tee-network. The form of the network illustrated there is repeated here in FIG. 14.

The effective resistance of our Tee is given by $$R_{EFF} = \frac{R_{12} R_{14}}{R_{13}} = \frac{(110 \text{ k}\Omega)^2}{25.5 \text{ }\Omega} = 475 \text{ M}\Omega, \qquad (178)$$

which is just the value of $R_2$ which we sought for the integrator.

There are two subsystems in the Fringe Rate Demodulator which could be modified to change its operating regime. The frequency-to-voltage converter is configured by the choice of $R_3$ and $C_1$ to achieve its peak output voltage for a specified peak input frequency. This frequency is dependent on both the amplitude and the frequency of the signal of interest, and therefore changes in these two components could be made to accommodate a different set of signal parameters. The integrator is the other subsystem which would need to be modified to accommodate such changes.

FIG. 15 is a block diagram showing how symmetric demodulation is accomplished.

The symmetric demodulator portion of this invention consists of a optoelectronic converter 301 which is a means for converting the optical intensity into an electrical signal (either analog or digital), a modulation stripper 303 which is a means for selecting the component of the intensity signal which is being modulated by an optical phase shift, a derivative cross multiplier 305 which is a means for generating a signal proportional to the time derivative of the optical phase shift, a modulation depth compensator 307 which is a means for removing the modulation power dependence from the output of the derivative cross multiplier 309, and an integrating circuit 446 which is a means for generating an optical phase shift signal from its time derivative.

The three optical signals from the interferometer enter the demodulator where they are converted into electrical signals, by photodiodes 401, 402, 403, these signals are labeled a, b, c, proportional to the optical intensity at each input. The photodiode amplifiers at 405, 406, 407 can each have separately trimmable gains to compensate for imbalances in the three arms of the interferometer or the photodiodes. One third of the sum of the signals a, b, and c, their average, is taken at summing and scaling circuit 410 and subtracted from a, b, and c at difference amplifiers 412, 413, 414 giving three signals labeled u, v, and w, with the result that $$u = +\frac{2}{3}a - \frac{1}{3}b - \frac{1}{3}c, \qquad (179)$$

$$v = -\frac{1}{3}a + \frac{2}{3}b - \frac{1}{3}c,$$

-continued $$w = -\frac{1}{3}a - \frac{1}{3}b + \frac{2}{3}c.$$

The time derivatives of u, v, and w, are taken at differentiating circuits 416, 417, 418. Various differences of the derivatives are taken at difference amplifiers 420, 421, 423, which are cross multiplied with u, v, and w in multiplying circuits 426, 427, 428 and summed together in summing circuit 430, giving the combination $u(\dot{w}-\dot{v})+v(\dot{u}-\dot{w})+w(\dot{v}-\dot{u})$, where the dot signifies the time derivative. When implementing the technique in analog form, it may be convenient to select a multiplier integrated circuit (IC) with differential inputs so that the functions of summing and multiplying can be combined in a single IC for each of the three arms.

The signals u, v, and w are squared at in squaring circuits 432, 433, 434, and the sum of these squares is generated in summing circuit 436. At division circuit 440, the output of summing circuit 430 is divided by the output of summing circuit 436. This result is then integrated in time in integrating circuit 446 and multiplied by the constant $\frac{2}{3}$. To some extent, the value of the multiplicative constant is arbitrary; it can be set to give a desired scaling factor or to compensate for the gains of previous stages. The value $\frac{2}{3}$ is appropriate if the gains of the earlier stages are unity and the desired scaling factor is 1 Volt per radian. The end result, at the output is the optical phase shift $\Phi$, which is given as $$\xi = \frac{2}{3} \int \frac{u(\dot{w}-\dot{v}) + v(\dot{u}-\dot{w}) + w(\dot{v}-\dot{u})}{u^2 + v^2 + w^2} dt. \quad (180)$$

Eqn. 5 gives the power from output k of the [3×3] coupler which terminates the optical fiber interferometric sensor, where k can be 1,2, or 3. For the moment, we shall neglect the "static" phase shift $\phi(t)$, regarding it as part of the signal of interest $\xi(t)$, for example. The form of the three equations was given graphically in FIG. 6. To make this plot, we used a sinusoidal stimulus $$\xi(t) = A \sin(\omega t) = 5\pi \sin(2\pi f t). \quad (181)$$

All three interferometric outputs look similar, but they are shifted by 120° from each other. In the plot, the three outputs also are separated from each other vertically so that they can be seen individually, and the sinusoidal stimulus is superimposed on the plot (to a different scale) so that the relationship between the stimulus and the interferometric outputs can be readily seen.

Before going on to explain how to recover the signal of interest, we shall digress at this point to explain a technique of measuring the actual phase difference between two outputs of the interferometer, using the Lissajous figure. At present, [3×3] optical fiber couplers are made by monitoring the ratio of power in each of the three outputs during fabrication to ensure the desired amount of power in each. This method is entirely suitable in the communications industry, but for interferometric applications, it would be preferable to monitor the phase difference between adjacent outputs and adjust it to be 120°.

In our technique of measuring the actual phase difference, we use a digital oscilloscope such as the Tektronix TEK2430. The plots were displayed on and printed by a TEK2430. This oscilloscope has the useful feature of permitting measurements of the Lissajous figure's dimensions on the screen. Two separate measurements of the Lissajous figure permit us to compute the phase angle between any two interferometric outputs. We can show this by first considering the two waveforms. For generality, we need not assume that both waveforms have equal amplitudes, and so they take on the form $$u_1(t) = E_1 \cos(\xi(t)) \text{ and } u_2(t) = E_2 \cos(\xi(t)+\phi). \quad (182)$$

In these equations, the amplitudes are $E_1$ and $E_2$, $\xi(t)$ is the signal of interest, and $\phi$ is the phase angle between the two outputs. We first measure $u_1(t)$ at some time $t_0$ when $u_2(t)=0$. We can readily solve for the phase angle of $u_1(t)$ at this instant:

$$\xi(t) = \pm \cos^{-1}\left(\frac{u_1(t_0)}{E_1}\right) + n2\pi, \quad (183)$$

where n is an arbitrary integer. Knowing that $u_2(t)=0$ and that its phase must contain the same phase component $\xi(t)$, we can find the phase difference $\phi$:

$$\xi(t) + \phi = \frac{\pi}{2} + m\pi \quad (184)$$

$$\phi = \frac{\pi}{2} + m\pi - \xi(t)$$

$$\phi = \frac{\pi}{2} + m\pi - n2\pi \mp \cos^{-1}\left(\frac{u_1}{E_1}\right),$$

where m, like n, is an arbitrary integer.

Thus we only require two measurements to obtain the phase angle $\phi$. We need the peak amplitude $E_1$ of the signal $u_1(t)$ and we need its amplitude at a time when the second signal $u_2(t)$ is zero. From their ratio and simple trigonometry, the phase angle can be obtained.

The oscilloscope we used makes it very easy to measure $E_1$. Actually, it is easier to measure $2E_1$, which is the greatest width of the elliptical Lissajous figure. We then measure the amplitude of the same signal along the axis where the second signal is zero. Actually, it is easier to measure the entire breadth of the Lissajous figure along this axis, which gives $2u_1(t)$ at time $t=t_0$. The ratio $(2u_1(t_0))/(2E_1)$ is, of course, the same as $u_1(t_0)/E_1$.

As an example of how to use this technique, we measured $2E_1=93.2$ mV and $2u_1(t_0)=74.0$ mV. For these values, the phase difference is $$\phi = 90° + \cos^{-1}\left(\frac{2u_1}{2E_1}\right) = 127°. \quad (185)$$

Notice that we have neglected the arbitrary integers m and n in this expression. This calculation gives a phase difference which is 7° away from the 120° which we would have preferred the couplers to deliver. On the other hand, this difference is good empirical evidence for the robustness of the technique which we shall now describe, for we still managed to recover signals with excellent fidelity from this imperfect [3×3] coupler.

Our first goal in the processing of the three interferometric output signals is to eliminate the constant D from the three outputs by subtraction. An easy way to compute D in a circuit is to add up all three signals and divide by 3. A typical implementation of an adder has some gain factor $K_1$ associated with it. We will arrange matters so that $k_1 = -\frac{1}{3}$. If we add up the three signals, we get $$S_1 = k_1 \sum_{i=1}^{3} x_i = k_1 \sum_{i=1}^{3} \left\{ D + E\cos\left[\xi - (k-1)\frac{2}{3}\pi\right]\right\} \quad (186)$$

$$= 3k_1 D + k_1 E \sum_{i=1}^{3} \cos\left[\xi - (k-1)\frac{2}{3}\pi\right].$$

By mathematical manipulation it can be shown that $$\sum_{k=0}^{N-1} e^{j\left[\theta - k\frac{2\pi}{N}\right]} = \quad (187)$$

$$\sum_{k=0}^{N-1} \left\{\cos\left(\theta - k\frac{2\pi}{N}\right) + j\sin\left(\theta - k\frac{2\pi}{N}\right)\right\} = 0.$$

The real part of this expression can only be zero if $$\sum_{k=0}^{N-1} \cos\left(\theta - k\frac{2\pi}{N}\right) = 0. \quad (188)$$

This is geometrically obvious since vectors comprising the sides of an equilateral, regular polygon must sum to zero because the polygon is closed. Applying this to Eqn (206), we see that $$S_1 = 3k_1 D = D. \quad (189)$$

Because we have a way of computing D (or, rather, its negative), we can subtract it from the interferometric outputs. This is akin to removing a constant offset from a signal by the use of lowpass filtering, except that using such a filter would preclude the correct processing of low frequency components in the signal of interest. What is worse, however, is that signals of interest with very small amplitude produce signals $x_k$ which do not vary much. This does not mean that they are always close to D, however: it only means that $$\cos\left[\xi - (k-1)\frac{2}{3}\pi\right]$$

is nearly constant. However, this constant multiplies E to produce different levels of signal in each of the three signal paths. Putting these signals through lowpass filters merely changes the constant offset, rather than eliminating it totally.

In FIG. 15, three adders are used to perform the subtraction. Let their outputs be called $x_{11}$, $x_{21}$, and $x_{31}$. Because these adders have some gain, $k_{a1}$, we have $$x_{k1} = k_{A1} E \cos[\xi - (k-1)\tfrac{2}{3}\pi]. \quad (190)$$

The next step is to differentiate each of the $x_{ki}$. The differentiators, too, have their own gain, $k_D$. The outputs of the three differentiators are $$x_{k2} = k_D \dot{x}_{k1} = -k_D k_{A1} E \dot{\xi} \sin[\xi - (k-1)\tfrac{2}{3}\pi]. \quad (191)$$

The three derivatives were simulated for the same case as in FIG. 6. Again, the sinusoidal stimulus is shown for reference, although still not to the same vertical scale as the derivatives. In the plots, we have dropped the second subscript, as if D were zero in $x_k$.

We can obtain the sine and cosine of the signal of interest from a set of three interferometric outputs, each 120° out of phase from the other. From the sine and cosine we can obtain the derivative of each. It is an easy matter to cross-multiply, subtract, and integrate the result to obtain a scaled replica of the signal of interest. How can we extend this idea so that all three signals might be used? Phasors are a tool which only apply to linear systems: processing which entails multiplication is non-linear. One can add two phasors together and get another phasor. One cannot multiply two phasors together at all. When two sinusoids are multiplied together the result consists of the sum of two sinusoids. One of these has a frequency which is the sum of the input frequencies; the other has a frequency which is the difference between the input frequencies. If the two inputs have the same frequency, which is the case for two signals represented by two phasors, their product contains a term at twice the input frequency and a constant term. In what follows, we shall ignore the constant term and focus our attention on the sinusoidal term at twice the input frequency. The output at twice the input frequency could be represented as a phasor, too, but it would normally not be shown on the same phasor diagram because of the fact that its frequency is different.

We shall take the liberty of breaking the rule that phasors at different frequencies never be discussed in the same sentence or drawn on the same diagram. However, the "phasor" representing the output signal at twice the frequency of the input signal is not a phasor in the conventional sense. Although in the figures which follow we show this output signal as an arrow in the complex plane, superimposed on a phasor diagram, the reader must be mindful that its frequency is different from that of the phasors in the diagram and the phase relationships between the various phasors and the output "phasor" are not constant. We shall be careful to use quotation marks around the word phasor whenever this output signal is being referred to. If the reader rebels at the heresy of using phasor techniques in non-linear signal processing, he may be somewhat mollified to know that without this highly unorthodox approach we would never have discovered the algorithm which we explain here.

In FIG. 16 we show the phasor approach applied to asymmetric demodulation. The small, black arrows show the two signals, sine and cosine, that the symmetric method uses. The cosine leads the sine, so it is the arrow labelled jE; the sine is labelled E. The derivatives are the intermediate-sized arrows with the white interiors. The derivative of the E is the $j\omega E$ phasor. The derivative of the jE phasor is the $-\omega E$ phasor. The large, diagonally-striped arrows show the cross-product "phasors" which the asymmetric method produces. Both cross-products are the same. The product of E and the derivative of jE is $-\omega E^2$. The product of jE and the derivative of E also is equal to $\omega E^2$.

At this point, the phasor approach collapses, for according to the asymmetric demodulation technique, the difference between these two cross-products is the derivative of the signal of interest. But the difference between these two "phasors" is zero. Only their sum would yield a non-zero result. The problem evaporates if we stick to a trigonometric description of the signal processing. It only occurs because we have used the wrong tool, the phasor tool. Yet the geometric interpretation provided by the phasor methods made the discovery of the method a reality. The insight was to apply the method to the symmetric modulation idea despite the obvious error in doing so.

FIG. 17 uses phasors to depict the idea behind symmetric demodulation. The small, black arrows represent the outputs of the interferometer. There are three, each separated by 120° from the other. (We use the notation $M \angle \theta$ to denote the complex number of magnitude M and phase angle $\theta$.) The derivatives of these three signals are shown in the intermediate-sized, white arrows. In dotted outlines, we show the negatives of these three derivatives, too. Note how the derivative of one signal and the negative of the derivative of a second signal bracket the third signal in a symmetric manner. By taking the difference of the two derivatives, a phasor parallel to the third signal is formed.

In symmetric demodulation, the product "phasors" line up along the 0°, 120°, and −120° axes, but because they contain $E^2$, their sum is not zero, as it would be if phasor addition of multiplied phasors were strictly correct, but the real constant 1.5. In fact, in general, one can divide 360° evenly into N pieces and add the squares of either the sines or the cosines to arrive at a total of N/2.

Now that we have arrived through graphical ideas at the basic method of combining derivatives and signals in the method of symmetric demodulation, we can show in mathematical terms what is going on.

We start by combining signal $x_{11}$ with the derivatives of $x_{21}$ and $x_{31}$, $$k_M x_{11}(\dot{x}_{21} - \dot{x}_{31}) = k_M k_{A1} E \cos(\xi) \begin{bmatrix} -k_D k_{A1} E \dot{\xi} \sin\left(\xi - \frac{2}{3}\pi\right) \\ +k_D k_{A1} E \dot{\xi} \sin\left(\xi + \frac{2}{3}\pi\right) \end{bmatrix}. \quad (192)$$

This simplifies to $$k_M x_{11}(\dot{x}_{21} - \dot{x}_{31}) = k_M k_{A1}{}^2 k_D E^2 \dot{\xi} \cos(\xi)[-\sin(\xi - \tfrac{2}{3}\pi) + \sin(\xi + \tfrac{2}{3}\pi)]. \quad (193)$$

We can apply to this the trigonometric identity $$\sin(A+B) - \sin(A-B) = 2 \cos(A) \sin(B) \quad (194)$$

to obtain $$k_M x_{11}(\dot{x}_{21} - \dot{x}_{31}) = k_M k_{A1}^2 k_D E^2 \dot{\xi} \cos(\xi) \left[ 2 \cos(\xi) \sin\left(\frac{2}{3}\pi\right) \right] \quad (195)$$

$$= \sqrt{3} \, k_M k_{A1}^2 k_D E^2 \dot{\xi} \cos(\xi).$$

Next we combine signal $x_{21}$ with the derivatives of $x_{31}$ and $x_{11}$, $$k_M x_{21}(\dot{x}_{31} - \dot{x}_{11}) = \quad (196)$$

$$k_M k_{A1} E \cos\left(\xi - \frac{2}{3}\pi\right) \begin{bmatrix} -k_D k_{A1} E \dot{\xi} \sin\left(\xi + \frac{2}{3}\pi\right) \\ +k_D k_{A1} E \dot{\xi} \sin(\xi) \end{bmatrix}.$$

This simplifies to $$k_M x_{21}(\dot{x}_{31} - \dot{x}_{11}) = k_M k_{A1} k_D E^2 \dot{\xi} \cos(\xi - \tfrac{2}{3}\pi)[-\sin(\xi + \tfrac{2}{3}\pi) + \sin(\xi)]. \quad (197)$$

If we rewrite this as $$k_M x_{21}(\dot{x}_{31} - \dot{x}_{11}) = \quad (198)$$

$$k_M k_{A1}^2 k_D E^2 \dot{\xi} \cos\left(\xi - \frac{2}{3}\pi\right) \begin{bmatrix} -\sin\left(\left[\xi - \frac{2}{3}\pi\right] - \frac{2}{3}\pi\right) \\ +\sin\left(\left[\xi - \frac{2}{3}\pi\right] + \frac{2}{3}\pi\right) \end{bmatrix}$$

then we can apply the same trigonometric identity to get $$k_M x_{21}(\dot{x}_{31} - \dot{x}_{11}) = k_M k_{A1}^2 k_D E^2 \dot{\xi} \cos\left(\xi - \frac{2}{3}\pi\right)\left[ 2\cos\left(\xi - \frac{2}{3}\pi\right) \sin\left(\frac{2}{3}\pi\right) \right] \quad (199)$$

$$= \sqrt{3} \, k_M k_{A1}^2 k_D E^2 \dot{\xi} \cos^2\left(\xi + \frac{2}{3}\pi\right).$$

Finally we combine signal $x_{31}$ with the derivatives of $x_{11}$ and $x_{21}$.

$$k_M x_{31}(\dot{x}_{11} - \dot{x}_{21}) = \quad (200)$$

$$k_M k_{A1} E \dot{\xi} \cos\left(\xi + \frac{2}{3}\pi\right) \begin{bmatrix} -k_D k_{A1} E \dot{\xi} \sin(\xi) \\ +k_D k_{A1} E \dot{\xi} \sin\left(\xi - \frac{2}{3}\pi\right) \end{bmatrix}.$$

This simplifies to $$k_M x_{31}(\dot{x}_{11} - \dot{x}_{21}) = k_M k_{A1}{}^2 k_D E^2 \dot{\xi} \cos(\xi - \tfrac{2}{3}\pi)[-\sin(\xi) - \sin(\xi - \tfrac{2}{3}\pi)]. \quad (201)$$

If we rewrite this as $$k_M x_{31}(\dot{x}_{11} - \dot{x}_{21}) = \quad (202)$$

$$k_M k_{A1}^2 k_D E^2 \dot{\xi} \cos\left(\xi + \frac{2}{3}\pi\right) \begin{bmatrix} -\sin\left(\left[\xi + \frac{2}{3}\pi\right] - \frac{2}{3}\pi\right) \\ +\sin\left(\left[\xi + \frac{2}{3}\pi\right] + \frac{2}{3}\pi\right) \end{bmatrix}$$

then we can once again apply the same trigonometric identity to get $$k_M x_{31} (\dot{x}_{11} - \dot{x}_{21}) = k_M k_{A1}^2 k_D E^2 \dot{\xi} \cos\left(\xi + \frac{2}{3}\pi\right)\left[2\cos\left(\xi + \frac{2}{3}\pi\right)\sin\left(\frac{2}{3}\pi\right)\right] \quad (203)$$

$$= \sqrt{3}\ k_m k_{A1}^2 k_D E^2 \dot{\xi} \cos^2\left(\xi + \frac{2}{3}\pi\right)$$

Visualizing a plot corresponding to the manipulations which have been described here without using a computer is no easy feat. In fact, a plot of the difference between two derivatives is very similar to the plots of the derivatives themselves.

When we sum the three expressions of Eqns (218), (222), and (226), using the gain constant $k_{A3}$, we obtain $$\sqrt{3}\ k_{A3} k_M k_{A1}^2 k_D E^2 \dot{\xi} \left[\cos^2(\xi) + \cos^2\left(\xi - \frac{2}{3}\pi\right) + \cos^2\left(\xi + \frac{2}{3}\pi\right)\right] = \frac{3}{2}\sqrt{3}\ k_{A3} k_M k_{A1}^2 k_D E^2 \dot{\xi}. \quad (204)$$

Consider the three formulas summed in Eqn (204). Once again, we include the sinusoidal stimulus in order to make clear the relation of the complicated expressions of Eqn (204) to the stimulus. The envelope of the three signals is itself now sinusoidal. How do we extract just the envelope?

If we wanted to, we could simply integrate the expressions in Eqn (204) and get a fair replica of the original signal of interest. $\xi$ (t). However, there is a factor of $E^2$ in the expressions, which implies that the derivatives still depend on the contrast between the dark and light extrema of the interference pattern. Since this is a number which wanders due to changes in laser intensity (which itself depends on the temperature) and due to changes in the polarization angle of the light within the optical fiber interferometric sensor, it would be useful to eliminate this factor.

We can do this by squaring each of the signals $x_{k1}$ and adding them up. The squaring operation can be performed with another multiplier of gain $k_M$ and the addition can be performed with another adder of gain $k_{A2}$. That is $$k_{A2} \sum_{k=1}^{3} k_M \left\{ k_{A1} E \cos\left[\xi - (k-1)\frac{2}{3}\pi\right]\right\}^2 = \quad (205)$$

$$\frac{3}{2} k_{A2} k_M k_{A1}^2 E^2.$$

In FIG. 18 we illustrate the result of the summation for the example we have been using in which the amplitude of the stimulus is $A = 5\pi$ radians. It should be clear from the figure that the sum of products is indeed proportional to the derivative of the sinusoid displayed with it. In the figure, the amplitudes of each waveform have been scaled for convenience, and so they are not labelled.

Both Eqns (204) and (205) include the factor $E^2$. We can eliminate this factor by dividing Eqn (228) into Eqn (227). Any practical divider has a gain which we shall call $k_d$ (not to be confused with $k_D$, the gain of the differentiators discussed above). Division yields $$k_d \frac{\frac{3}{2}\sqrt{3}\ k_M k_{A3} k_{A1}^2 k_D E^2}{\frac{3}{2} k_{A2} k_M k_{A1}^2 E^2} \dot{\xi} = \frac{\sqrt{3}\ k_{A3} k_D k_d}{k_{A2}} \dot{\xi}. \quad (206)$$

We can integrate this with an integrator of gain $k_1$ to get $$k_1 \int \frac{\sqrt{3}\ k_{A3} k_D k_d}{k_{A2}} \dot{\xi} dt = \frac{\sqrt{3}\ k_1 k_{A3} k_D k_d}{k_{A2}} \xi. \quad (207)$$

By the processing algorithm developed here, we have the ability to recover a scalar multiple of the signal of interest, $\xi(t)$. It is important to recognize that neither D nor E appear in this final expression. This means that the scale factor of the demodulator is independent of the average power in the laser, and it is also independent of the fringe depth.

The scalar multiple consists of factors which we can control in implementing the algorithm. They include the gains of two adders, the gain of three identical differentiators, and the gain of the final integrator. These factors can be chosen within certain constraints to provide $\xi(t)$ scaled to whatever level is desired. In an analog implementation of this scheme, clipping of signals constrains the selection of these parameters at the high-frequency limit, and the noise of the circuit constrains their selection at the low-frequency limit.

We now turn to a detailed discussion of each of the several stages in the Symmetric Analog Demodulator.

The receivers comprise the three photodetectors CR1, CR2, and CR3 together with the three transimpedance amplifiers built around operational amplifiers U1, U2, and U3. These three amplifiers are Burr-Brown OPA111s. They feature very low bias currents of, at most, 2 pA, which contribute only 130 nV to the output offset voltage when passed through the 64.9 kΩ feedback resistors R1, R2, and R3. The input voltage offset is less than 500 $\mu$V. This offset voltage appears with gain 1 at the output of the transimpedance amplifier. The maximum drift in input offset current is 5 $\mu$V/K: over 50 K. of temperature drift, this amounts to no more than a 250 $\mu$V drift in the 500 $\mu$V figure previously mentioned for a total of no more than 750 $\mu$V. Although this amount is far larger than that due to the bias current, it is nonetheless very small. The unity gain bandwidth of the OPA111 is 2 MHz.

The OPA111 also provides very low voltage noise, no more than 40 nV/$\sqrt{HZ}$ at a frequency of 100 Hz, and typically only 15 nV/$\sqrt{Hz}$. Since this is the input stage of the entire circuit, we wish to minimize the contribution of the receiver to the overall noise, so the OPA111 makes a good choice.

When the laser's monitor current was 58.2 $\mu$A (indicating that the laser diode was emitting 7.1 mW optical power), the three photodiodes produced measured voltages D=26.3 mV, 25.9 mV, and 29.0 mV across transimpedance amplifiers with 500 Ω in the feedback path. The fluctuation in these voltages was E=9 mV, 10 mV, and 10 mV. We increased the resistances to 64.9 kΩ in order to raise the peak voltages to around 5 V under these conditions. The value 5 V was about half-way through the range in which we desired to work. −10 V to +10 V. This allowed room for fluctuations of the laser power to higher levels without saturating the transimpedance amplifiers. These changes altered the voltages from the transimpedance amplifiers to $$D \approx (150 \, \mu W)\left(370 \frac{mA}{W}\right)(64.9 \, k\Omega) \quad (208)$$
$$= 3.6 \, V.$$

and $$E \approx (55 \, \mu W)\left(370 \frac{mA}{W}\right)(64.9 \, k\Omega) \quad (209)$$
$$= 1.3 \, V.$$

In the laboratory, we used fairly lengthy ($\approx 1$ m long) coaxial leads to transmit the currents from the photodiodes to the transimpedance amplifiers. The capacitance presented by these leads was sufficient to act as a differentiator of the interferometric signals, enhancing their high frequencies. We compensated for this empirically by placing 10 pF capacitors C1, C2, and C3 across the feedback. We believe these could be reduced or eliminated if more attention were paid to lead capacitances by placing the photodiodes in close proximity to the amplifiers.

The choice of operational amplifiers throughout the rest of the circuit was not as critical. We selected Analog Devices AD712 dual precision operational amplifiers. These have a higher unity-gain bandwidth than the OPA111s, 4 MHz. Their voltage noise is typically 45 nV/√Hz at 100 Hz, higher than the typical value of 15 nV/√Hz for the OPA111, but still respectably small. Their input offset voltage is at most 3 mV. Their input bias current has a maximum of 75 pA. These are good, general-purpose operational amplifiers.

Eqn (189) implied that the averaging circuit implemented around operational amplifier U4A needs to have gain $k_1 = -\frac{1}{3}$. We can achieve this by picking 102 kΩ input resistors R4, R5, and R6 and a 34.0 kΩ feedback resistor R7. The design of summing amplifiers is explained in numerous books on operational amplifiers (for example, see Sedra et al, *Microcircuit Electronics*, Holt, Rinehart and Winston, 1982) and so will not be further discussed here, except to say that we also added a 1 μF feedback capacitor C18 in parallel with the 34.0 kΩ resistor R7 to eliminate the ripple in the output. The ripple was due to the fact that although each interferometric output is assumed to have equal central values D and peak deviations E from this value, in fact these values are not all equal to one another. Furthermore, the phase differences between different legs are not exactly 120°. As a result, the sum is not a constant. The capacitor masks the variation in the result. Although it only produces an approximation of the theoretical constant D, we found that the amount of constant offset left after the subsequent addition stage in U5A, U6A, and U7A was not so severe as to render the technique of symmetric demodulation useless.

The summing circuits U5A, U6A, and U7A are designed to provide the summing gain $k_{A1}$ of Eqn (212).

Again we want to let these amplifiers have peak outputs of 5 V to permit fluctuations in laser power without causing saturation of the amplifiers. Since these summers remove D from the signal, the amplitudes coming out of them is dependent on E and the gain of the summers. From Eqn (230) we know that E=1.3 V. So we should pick the gain to be $$k_{A1} = \frac{5 \, V}{1.3 \, V} = 3.8 \quad (210)$$

We can achieve roughly this level of gain (precision is not important here because the signal levels are so highly variable) by selecting 13.7 kΩ input resistors and 51.1 kΩ feedback resistors. For this choice, we actually achieve $$k_{A1} = \frac{51.1 \, k\Omega}{13.7 \, k\Omega} = 3.73. \quad (211)$$

The next step in the demodulation technique is to differentiate the outputs of the summing amplifiers U5A, U6A, and U7A. Operational amplifiers U5B, U6B, and U7B are configured to do this. The transfer function G(f) of the differentiating circuit if the two pole frequencies are equal to one another and if the operating frequency is well below this is $$G(f) = \frac{V_{OUT}}{V_{IN}} \approx -R_2 C_1 j 2\pi f = k_D. \quad (212)$$

The relative error in the magnitude of the gain, which depends on how far away from the pole frequency $f_p$ we elect to operate is $$\epsilon_M = -\frac{1}{1 + \left(\frac{f_p}{f}\right)^2}. \quad (213)$$

The error in the phase of the gain, which, likewise, depends on how far away from the pole frequency we elect to operate is $$\epsilon_p = -2\tan^{-1}\left(\frac{f}{f_p}\right). \quad (214)$$

We designed the circuit to handle peak phase shifts of 100 radians when the signal of interest had a frequency of 200 Hz. The time for the signal of interest to change from zero to its peak amplitude is a quarter of a cycle, or π/2 radians. So if the peak phase shift is A, there are $$\frac{A}{\left(\frac{\pi}{2}\right)} \quad (215)$$

cycles of the interferometric output in a quarter cycle of the signal of interest. The period of a cycle is T, so a rough approximation of the peak frequency present in the signal of interest is $$\frac{A}{\left(T\frac{\pi}{2}\right)} = \frac{2Af}{\pi}. \tag{216}$$

Thus we expect frequencies up to $$\frac{2(100 \text{ rad})(200 \text{ Hz})}{\pi} = 12.7 \text{ kHz}. \tag{217}$$

We can use this value, along with out desire to keep the phase error less than 2° at this peak frequency, to choose the pole frequency.

$$\epsilon_p = -2\tan^{-1}\left(\frac{f}{f_p}\right) \tag{218}$$

$$2° < \left|-2\tan^{-1}\left(\frac{12.7 \text{ kHz}}{f_p}\right)\right|.$$

From this, we conclude that we must pick $f_p = 728$ kHz. This means that $$R_1C_1 = R_2C_2 = \frac{1}{f_p} = 219 \text{ ns}. \tag{219}$$

In picking the gain of the differentiator, we have a conflict between what we would like the gain to be and what the AD712 can deliver. We still want a 5 V margin between the expected peak signal and the upper limit of 10 V we want to impose. For a simple, sinusoidal signal of interest of the form $$\xi = A \sin(2\pi ft), \tag{220}$$

the derivative of the interferometric outputs (after passing through the summers) is $$\begin{aligned}\dot{\xi} &= k_D \frac{d}{dt} k_{A1} E \cos[A\sin(2\pi ft)] \tag{221}\\ &= -2\pi f k_D k_{A1} A E \cos(2\pi ft) \sin[A\text{SIN}(2\pi ft)].\end{aligned}$$

To ensure that, when f=200 Hz and A=100 rad, we still do not get more than 5 V from the circuit, we set $$5 V = 2\pi f k_D k_{A1} A E = 2\pi f R_2 C_1 k_{A1} A E \tag{222}$$

$$R_2C_1 = \frac{5 V}{2\pi f k_{A1} AE}.$$

We sought a peak output of 5 V from the adders U5A, U6A, and U7A, so we will treat $$\frac{5 V}{k_{A1}E} \approx 5 V. \tag{223}$$

Hence $$\begin{aligned}R_2C_1 &= \frac{1}{2\pi Af} \tag{224}\\ &= \frac{1}{2\pi(100 \text{ rad})(200 \text{ Hz})}\\ &= 7.96 \text{ }\mu s.\end{aligned}$$

But at high frequencies, the AD712 is not guaranteed to sustain more than a 3 MHz gain-bandwidth product. That is $$\begin{aligned}\text{Gain} \times \text{Bandwidth} &= 3 \text{ MHz} \tag{225}\\ (2\pi R_2C_1f) \times \text{Bandwidth} &= 3 \text{ MHz}\\ \text{Bandwidth} &= \frac{3 \text{ MHz}}{(2\pi R_2C_1f)}.\end{aligned}$$

The maximum permissible bandwidth is dictated by the maximum frequency f in this equation. Setting the bandwidth equal to the maximum frequency, we get $$\begin{aligned}f &= \sqrt{\frac{3 \text{ MHz}}{2\pi R_2 C_1}} \tag{226}\\ &= \sqrt{\frac{3 \text{ MHz}}{2\pi(7.96 \text{ }\mu s)}}\\ &= 245 \text{ kHz}.\end{aligned}$$

But earlier we decided we needed 728 kHz for the pole frequency. FIG. 19 is a Bode plot of the gain of the AD712 and of the differentiator gain characteristic we want to achieve. As long as we demand less gain than the operational amplifier can provide, the feedback control loop is closed, and our desired gain is the actual gain of the circuit. But if the gain we want gets too big, the operational amplifier no longer has enough excess loop gain to keep control: the amplifier's own transfer characteristic becomes dominant. As the figure makes clear, we must compromise by lowering the gain of the differentiator until its characteristic peaks at the pole frequency, 728 Khz, where it intersects the gain characteristic of the operational amplifier. The new value of the gain is $$\begin{aligned}R_2C_1 &= \frac{3 \text{ MHz}}{2\pi f^2} \tag{227}\\ &= \frac{3 \text{ MHz}}{[2\pi (728 \text{ kHz})^2]}\\ &= 901 \text{ ns}.\end{aligned}$$

By trial and error, we find combinations of $R_1$, $R_2$, $C_1$, and $C_2$ which correspond to available values of the components and which meet the conditions we have derived in Eqns (219) and (227). A suitable combination is $$\begin{aligned}R_1 &= 464 \text{ }\Omega \quad C_1 = 470 \text{ pF} \tag{228}\\ R_2 &= 1.91 \text{ }k\Omega \quad C_2 = 100 \text{ pF}.\end{aligned}$$

The gain constant for the differentiator thus is $$k_D = -R_2C = -901 ns. \tag{229}$$

The multipliers U11, U12, U13, U8, U9, and U10 in the schematic are very easy to use. Three of them are used to compute the crossproduct of interferometric signals with the difference in the derivatives of the other two signals. These are the multipliers U11, U12, and U13.

One differential pair of inputs is one interferometric output (with D subtracted off) and ground (zero). The other pair consists of the outputs of two differentiators.

Their difference is computed internally to these AD534 multipliers and the product is produced at the output.

The squares of the interferometric outputs (with D subtracted off) are computed by U8, U9, and U10. Later on in the circuit, the denominator input to the DIV100 (U15) must be positive. To guarantee this, we connected these three multipliers to produce negative squares. So the inputs were provided to a non-inverting terminal of one of the differential inputs and to an inverting terminal on the other differential input. The remaining input terminals were connected to ground.

The AD534 has a built-in multiplicative scale factor of $0.1\ V^{-1}$. Thus two full scale inputs (10 V is full scale) will produce an output of $(0.1\ V^{-1})(10\ V)(10\ V) = 10\ V$. Since we have been assuming that peak signal levels of 5 V are present at the outputs of all stages, we expect to see $(0.1\ V^{-1})\ (5\ V)\ (5\ V) = 2.5\ V$. The small signal bandwidth of the AD534 is 1 MHz. Its noise spectral density is large compared to that associated with good operational amplifiers: 800 $nV/\sqrt{Hz}$ at 10 kHz; it is larger at 100 Hz, about 900 $nV/\sqrt{Hz}$.

The adder in U14A is very similar to that in U4A described earlier. To compute the required gain, we make use of Eqn (204). It gives the output of this adder as $$\frac{3}{2}\ \sqrt{3}\ k_{A3}k_Mk_{A1}^2K_DE^2\xi. \tag{230}$$

We want this to peak at 5 V when A=100 rad and f=200 Hz. So $$\frac{3}{2}\ \sqrt{3}\ k_{A3}k_Mk_{A1}^2k_DE^2\xi =$$

$$-\frac{3}{2}\ \sqrt{3}\ k_{A3}k_Mk_{A1}^2k_DE^2A2\pi f\sin[A\sin(2\pi ft)]$$

$$5\ V > \frac{3}{2}\ \sqrt{3}\ k_{A3}(0.1\ V^{-1})(3.8)^2(901\ ns)(1.3\ V)^2A2\pi f$$

$$k_{A3} = \frac{2(5\ V)}{3\sqrt{3}\ (0.1\ V^{-1})(3.8)^2(901\ ns)(1.3\ V)^2(100\ rad)2\pi(200\ Hz)} \tag{231}$$

$$= 7.0.$$

We later decided to lower this value in order to accommodate input phase shifts of 239 rad, more than the 100 rad used in this calculation, so our final choice for input resistors to U14A was 14.0 kΩ with a 4.99 kΩ feedback resistor, giving $$k_{A3} = \frac{4.99\ k\Omega}{14.0\ k\Omega} = 0.356. \tag{232}$$

We now turn to the summer U4B which adds together the squares of the interferometric outputs (with D subtracted off) which are produced by U8, U9, and U10.

From Eqn (205)

$$\frac{3}{2}\ k_{A2}k_Mk_{A1}^2E^2 \leq 5\ V \tag{233}$$

$$k_{A2} \leq \frac{2(5\ V)}{3k_Mk_{A1}^2E^2}$$

-continued $$= \frac{2(5\ V)}{3(0.1\ V^{-1})\ (3.8)^2(1.3\ V)^2}$$

$$= 1.37.$$

We selected input resistor R26, R30, and R35 to be 10.5 kΩ and the feedback resistor R37 to be 14.0 kΩ, giving an actual value of $$k_{A2} = 1.33. \tag{234}$$

The outputs of the two adders U14A and U4B form the numerator and denominator inputs respectively to the Burr-Brown DIV100 (U15). The DIV100 has a small signal bandwidth of 350 kHz. The denominator needs to be greater than 250 mV for reasonable accuracy, and it must be positive. As mentioned above, this was easily arranged by causing the multipliers U8, U9, and U10 to generate negative squares. Subsequently U4B inverted the sum, so this constraint was met.

The DIV100 has a scale factor $$k_d = 10\ V. \tag{235}$$

In the range 10 Hz to 10 kHz, the DIV100 generates voltage noise between 370 $\mu V/\sqrt{Hz}$ and 1 $mV/\sqrt{Hz}$. This is greater than the noise of the AD534 multipliers, and it is vastly bigger than the noise of the operational amplifiers we have used so far.

We use the DIV100 to remove the effects of E from the demodulated signal. Recall that E is affected by laser power and the fringe depth of the interference pattern, which varies as the polarization of the light within the interferometer wanders.

The output of the divider is given by Eqn (206) which is $$\frac{\sqrt{3}\ k_{A3}k_Dk_d}{k_{A2}}\xi. \tag{236}$$

Upon integration by U14B, Eqn (207) shows that the demodulator's output is $$\frac{\sqrt{3}\ k_1k_{A3}k_Dk_d}{k_{A2}}\xi. \tag{237}$$

The final gain constant is that of the integrator:

$$k_1 = -\frac{1}{R_{51}C_{17}} = 6.89 \times 10^3\ s^{-1}. \tag{238}$$

We can now substitute all the constants into Eqn (236):

$$\frac{\sqrt{3}\ (6.89 \times 10^3\ s^{-1})(0.356)(901\ ns)(10\ V)}{1.33} = 29\ \frac{mV}{rad}. \tag{239}$$

The symmetric demodulator of the invention has been described in terms of the fiber optics application in which it was reduced to practice, but it can be used in other optical applications than fiber optics such as on an optical bench. The symmetric demodulator can also be used with other signal processing applications where the input to the symmetric demodulator is three coherent signals related by approximately 120 degrees phase difference.

The symmetric demodulator of the invention has been described in terms of its best mode, but it is clear that elements could be left out of the circuit which would result in an operative but not optimal embodiment. For example, the integrator could be eliminated and the rate of change of the signal of interest used as the output of the circuit. Similarly, other sections of the circuit could be eliminated to obtain a less accurate but still useful signal. For example, the modulation stripper could be eliminated but its use permits a steadier signal at constant phase shift.

Furthermore, since $\dot{w}(u-v)+\dot{v}(w-u)+\dot{u}(v-w)$ is equivalent to $u(\dot{w}-\dot{v})+v(\dot{u}-\dot{w})+w(\dot{v}-\dot{u})$, it follows that in the derivative cross multiplier it is equivalent to take the differences between u, v and w and multiply by the time derivatives before adding the signals.

Another equivalent would be to replace the differentiating circuits 416, 417, 418 with these integrating circuits and the integrator 446 with a differentiating circuit.

This symmetric demodulation scheme could be extended to more than three signals with obvious modifications. For example, for n signals the separation would be approximately 360/n degrees and in the modulation stripper the sum of all the signals would be scaled by 1/n. The modulation stripper would produce signals $$u_i = + \frac{(n-1)}{n} a_i - \frac{1}{n} a_{i+1} - \frac{1}{n} a_{i+2} \cdots \quad (140)$$

from the signals $a_i$ where i runs from 1 to n. The phase shift would be of the form $$\xi = \frac{2}{n} \int \frac{u_i(\dot{u}_{i-1} - \dot{u}_{i+1}) + u_{i+1}(\dot{u}_i - \dot{u}_{i+2}) + \cdots}{u_i^2 + u_{i+1}^2 + \cdots} dt \quad (141)$$

This invention is not limited to the preferred embodiment and alternatives heretofore described, to which variations and improvements may be made, without departing from the scope of protection of the present patent and true spirit of the invention, the characteristics of which are summarized in the following claims.

We claim:

1. A highly sensitive interferometer sensor comprising:
   a radiation source means for generating a coherent beam of radiation,
   a first coupler means for splitting said beam into two beams,
   a differential transducer means for converting a signal of interest into phase shift in said two beams,
   a second coupler means for recombining said two beams to produce three phase-modulated signals x, y and z,
   a radiation converter means for converting the three phase modulated signals into a set of three electrical signals, a, b, and c,
   a symmetric demodulator circuit for converting the set of three electrical signals a, b and c into a single electrical signal $\xi$ which is proportional to the signal of interest.

2. The sensor of claim 1 wherein said symmetric demodulator circuit includes
   modulation stripper means for selecting a component of the electrical signal proportional to the beam intensity which is being modulated by a phase shift the output signals of said modulation stripper being u, v and w, and
   circuit means for forming a phase shift signal $\xi$ which is proportional to $$\int \frac{u(\dot{w} - \dot{v}) + v(\dot{u} - \dot{w}) + w(\dot{v} - \dot{u})}{u^2 + v^2 + w^2} dt$$

from u, v and w.

3. The sensor of claim 1 wherein said symmetric demodulation circuit includes
   a summing and scaling circuit means for summing the three electrical signals a, b, and c from said radiation convertor and scaling the sum by one-third to form a signal d,
   three difference amplifier means for taking the difference between each of said signals a, b and c and said signal d to form signals u, v, and w, and
   circuit means for forming a phase shift signal $\xi$ which is proportional to $$\int \frac{u(\dot{w} - \dot{v}) + v(\dot{u} - \dot{w}) + w(\dot{v} - \dot{u})}{u^2 + v^2 + w^2} dt.$$

from u, v and w.

4. The sensor of claim 1 wherein said symmetric demodulation circuit includes
   circuit means for forming the signals $$u = +\tfrac{2}{3}a - \tfrac{1}{3}b - \tfrac{1}{3}c,$$

$$v = -\tfrac{1}{3}a + \tfrac{2}{3}b - \tfrac{1}{3}c,$$

$$w = -\tfrac{1}{3}a - \tfrac{1}{3}b + \tfrac{2}{3}c,$$

from the three signals a, b and c from said radiation convertor,
   circuit means for forming a phase shift signal $\xi$ which is proportional to $$\int \frac{u(\dot{w} - \dot{v}) + v(\dot{u} - \dot{w}) + w(\dot{v} - \dot{u})}{u^2 + v^2 + w^2} dt.$$

from u, v and w.

5. The sensor of claim 1 wherein said symmetric demodulator circuit includes:
   a modulation stripper means for scaling and combining the three phase-modulated electrical signals a, b, and c from said radiation convertor means to form three new signals e, f and g,
   a derivative cross multiplier means for generating three electrical signals k, l and m which are proportional to the time derivatives of the electrical signals e, f and g from said modulation stripper means and for generating a signal proportional to the sum of the products of the electrical signal group from said modulation stripper means with differences between the electrical signal of time derivatives,
   a modulation depth compensator means for removing the modulation power dependence from the output of the signal from said derivative cross multiplier means, and
   an integrating circuit means for generating an electrical signal $\xi$ which is proportional to the signal of interest from the signal from said modulation depth compensator means.

6. The sensor of claim 1 wherein said symmetric demodulation circuit includes
a summing and scaling circuit means for summing the three first phase-modulated electrical signals and scaling the sum by one-third,
first three difference amplifier means for taking the difference between each of the three first electrical signals and the output of said summing and scaling circuit to produce three second electrical signals,
differentiating circuit means for taking three time derivatives of said three second electrical signals u,v, and w to produce three third electrical signals $\dot{u},\dot{v},\dot{w}$,
second three difference amplifier means for taking the difference signals between all three combinations of pairs of the three second electrical signals to produce three fourth electrical signals (w−v),(u−w),(v−u),
multiplying circuit means for multiplying each of said three fourth electrical signals by one of the three third electrical signals to produce three fifth electrical signals $\dot{u}(w-v),\dot{v}(u-w),\dot{w}(v-u)$,
squaring circuit means for taking the squares of the three second electrical signals to produce three sixth electrical signals $u^2,v^2,w^2$,
first summing circuit means for summing said three sixth electrical signals to produce a seventh electrical signal $u^2+v^2+w^2$,
second summing circuit means for summing said three fifth electrical signals to produce an eighth electrical signal $u(w-v)+v(u-w)+w(v-u)$,
division circuit means for dividing said eighth electrical signal by said seventh electrical signal to produce a ninth electrical signal $$\frac{\dot{u}(w-v)+\dot{v}(u-w)+\dot{w}(v-u)}{u^2+v^2+w^2},$$

integrating circuit means for producing a tenth electrical signal proportional to phase shift signal by integrating said ninth electrical signal $$\int \frac{\dot{u}(w-v)+\dot{v}(u-w)+\dot{w}(v-u)}{u^2+v^2+w^2} dt.$$

7. of claim 1 wherein said symmetric demodulator circuit includes circuit means for forming the signals $$u=+\tfrac{2}{3}a-\tfrac{1}{3}b-\tfrac{1}{3}c,$$
$$v=-\tfrac{1}{3}a+\tfrac{2}{3}b-\tfrac{1}{3}c,$$
$$w=-\tfrac{1}{3}a-\tfrac{1}{3}b+\tfrac{2}{3}c,$$

from the three signals a, b and c from said radiation convertor means,
circuit means for forming a phase shift signal $\xi$ which is proportional to $$\int \frac{\dot{u}(w-v)+\dot{v}(u-w)+\dot{w}(v-u)}{u^2+v^2+w^2} dt$$

from u, v and w.

* * * * *